United States Patent
Ichihashi

(10) Patent No.: US 11,860,513 B2
(45) Date of Patent: *Jan. 2, 2024

(54) OPTICAL ELEMENT DRIVING MECHANISM HAVING A POSITION SENSING ASSEMBLY

(71) Applicant: TDK TAIWAN CORP., Taoyuan (TW)

(72) Inventor: Shusuke Ichihashi, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,991

(22) Filed: Jan. 19, 2023

(65) Prior Publication Data
US 2023/0152669 A1 May 18, 2023

Related U.S. Application Data

(63) Continuation of application No. 16/938,264, filed on Jul. 24, 2020, now Pat. No. 11,573,480.

(Continued)

(51) Int. Cl.
*G03B 13/36* (2021.01)
*G02B 7/09* (2021.01)
(Continued)

(52) U.S. Cl.
CPC ............. *G03B 13/36* (2013.01); *G01P 15/02* (2013.01); *G02B 7/04* (2013.01); *G02B 7/08* (2013.01);
(Continued)

(58) Field of Classification Search
CPC . G03B 13/36; G03B 5/00; G03B 5/02; G03B 2205/0007; G03B 2205/0069;
(Continued)

(56) References Cited

U.S. PATENT DOCUMENTS

| | | | |
|---|---|---|---|
| 2004/0052513 A1* | 3/2004 | Ohkawara | H04N 23/68 348/E5.046 |
| 2008/0136924 A1* | 6/2008 | Washisu | G02B 27/646 348/E5.046 |

(Continued)

FOREIGN PATENT DOCUMENTS

| | | |
|---|---|---|
| CN | 107976857 | 5/2018 |
| CN | 109725473 | 5/2019 |

OTHER PUBLICATIONS

An Office Action (dated Apr. 20, 2023) and Search Report (dated Apr. 20, 2023) in corresponding CN Application No. 202010720272.4 are attached, 4 and 3 pages respectively.

*Primary Examiner* — Usman A Khan
(74) *Attorney, Agent, or Firm* — Muncy, Geissler, Olds & Lowe, P.C.

(57) ABSTRACT

A driving mechanism is provided. The driving mechanism includes a fixed portion, a movable portion movable relative to the fixed portion, a driving assembly used for driving the movable portion to move relative to the fixed portion, and a position sensing assembly for detecting the movement of the movable portion relative to the fixed portion. The driving assembly drives the movable portion by a control signal provided by a control assembly, and the driving assembly includes shape memory alloy. The control assembly receives a position signal provided by the position sensing assembly. The movable portion vibrates relative to the fixed portion at a frequency that is lower than a maximum frequency, and the maximum frequency is less than 10000 Hz.

20 Claims, 20 Drawing Sheets

Related U.S. Application Data

(60) Provisional application No. 62/879,190, filed on Jul. 26, 2019.

(51) Int. Cl.

| | |
|---|---|
| *G02B 7/04* | (2021.01) |
| *G02B 27/64* | (2006.01) |
| *G03B 5/00* | (2021.01) |
| *H02K 41/035* | (2006.01) |
| *G02B 7/08* | (2021.01) |
| *G01P 15/02* | (2013.01) |
| *G03B 5/02* | (2021.01) |
| *H02K 33/18* | (2006.01) |
| *H04N 23/50* | (2023.01) |
| *H04N 23/51* | (2023.01) |
| *H04N 23/54* | (2023.01) |
| *H04N 23/55* | (2023.01) |
| *H04N 23/57* | (2023.01) |

(52) U.S. Cl.
CPC .............. *G02B 7/09* (2013.01); *G02B 27/646* (2013.01); *G03B 5/00* (2013.01); *G03B 5/02* (2013.01); *H02K 33/18* (2013.01); *H02K 41/0354* (2013.01); *H02K 41/0356* (2013.01); *H04N 23/50* (2023.01); *H04N 23/51* (2023.01); *H04N 23/54* (2023.01); *H04N 23/55* (2023.01); *H04N 23/57* (2023.01); *G03B 2205/0007* (2013.01); *G03B 2205/0069* (2013.01); *G03B 2205/0076* (2013.01)

(58) Field of Classification Search
CPC ... G03B 2205/0076; G01P 15/02; G02B 7/04; G02B 7/08; G02B 7/09; G02B 27/646; H02K 33/18; H02K 41/0354; H02K 41/0356; H04N 23/50; H04N 23/51; H04N 23/54; H04N 23/55; H04N 23/57
USPC ........................................................ 348/373
See application file for complete search history.

(56) References Cited

U.S. PATENT DOCUMENTS

| | | | |
|---|---|---|---|
| 2009/0160955 A1* | 6/2009 | Tabuchi | G03B 5/00 |
| | | | 348/208.6 |
| 2010/0153680 A1* | 6/2010 | Baum | G11B 5/5565 |
| | | | 711/E12.002 |
| 2011/0279899 A1* | 11/2011 | Motoike | H04N 23/687 |
| | | | 359/557 |
| 2012/0092511 A1* | 4/2012 | Wakamatsu | G02B 27/646 |
| | | | 359/554 |
| 2015/0277140 A1* | 10/2015 | Minamisawa | G03B 5/06 |
| | | | 359/557 |
| 2015/0281581 A1* | 10/2015 | Sakurai | H04N 23/6812 |
| | | | 348/208.2 |
| 2016/0073027 A1* | 3/2016 | Noguchi | H04N 23/6812 |
| | | | 348/208.6 |
| 2016/0261806 A1* | 9/2016 | Honjo | H04N 23/6812 |
| 2017/0094173 A1* | 3/2017 | Sakai | H04N 23/687 |
| 2017/0257574 A1* | 9/2017 | Honjo | H04N 23/687 |
| 2018/0171991 A1* | 6/2018 | Miller | F03G 7/0614 |

\* cited by examiner

OPTICAL ELEMENT DRIVING MECHANISM HAVING A POSITION SENSING ASSEMBLY

CROSS REFERENCE TO RELATED APPLICATIONS

This application is a Continuation of pending U.S. patent application Ser. No. 16/938,264, filed Jul. 24, 2020 and entitled "OPTICAL ELEMENT DRIVING MECHANISM WITH DIFFERENT CONTROL MODES", which claims the benefit of U.S. Provisional Application No. 62/879,190, filed on Jul. 26, 2019, the entirety of which is incorporated by reference herein.

BACKGROUND OF THE DISCLOSURE

Field of the Disclosure

The present disclosure relates to an optical element driving mechanism with different control modes.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and more durability. As a result, how to effectively reduce the size of the driving mechanism and how to increase its durability have become important issues.

BRIEF SUMMARY OF DISCLOSURE

A driving mechanism is provided. The driving mechanism includes a fixed portion, a movable portion, and a driving assembly. The movable portion is movably connected to the fixed portion. The driving assembly is used for driving the movable portion to move relative to the fixed portion. The driving assembly is driven by a control signal provided by a control assembly. The driving assembly includes a shape memory alloy.

In some embodiments, the movable portion is used for connecting to an optical assembly having a main axis, and the movable portion is positioned in the accommodation space of the fixed portion. The driving mechanism further includes a position sensing assembly for detecting the movement of the movable portion relative to the fixed portion, and the control assembly receives a position signal provided by the position sensing assembly. The position signal includes a first position signal and a second position signal. The position sensing assembly includes a first position sensor, a second position sensor, a first reference element, and a second reference element. The first position sensor is used for detecting the movement of the movable portion relative to the fixed portion in a first dimension, and used for providing the first position signal. The second position sensor is used for detecting the movement of the movable portion relative to the fixed portion in a second dimension, and used for providing the second position signal. The first reference element corresponds to the first position sensor, and the first reference element includes a first magnetic unit. The second reference element corresponds to the second position sensor, the second reference element includes a second magnetic unit, and the position sensing assembly is at least partially positioned in the accommodation space.

In some embodiments, the driving assembly includes a first driving element and a second driving element. The first driving element is used for driving the movable portion to move relative to the fixed portion, and the first driving element includes a first driving unit and a second driving unit. The first driving unit is used for driving the movable portion to move relative to the fixed portion, the material of the first driving unit includes shape memory alloy, and the first driving unit is strip-shaped and extends in a first direction. The second driving unit is used for driving the movable portion to move relative to the fixed portion, the material of the second driving unit includes shape memory alloy, and the second driving unit is strip-shaped and extends in a second direction. The second driving unit is used for driving the movable portion to move relative to the fixed portion, and the second driving element includes a third driving unit and a fourth driving unit. The third driving unit is used for driving the movable portion to move relative to the fixed portion, the material of the third driving unit includes shape memory alloy, and the third driving unit is strip-shaped and extends in a third direction. The fourth driving unit is used for driving the movable portion to move relative to the fixed portion, the material of the fourth driving unit includes shape memory alloy, and the fourth driving unit is strip-shaped and extends in a fourth direction. The first direction is different than the third direction, the second direction is different than the third direction, the first direction is substantially parallel to the second direction, and the third direction is substantially parallel to the fourth direction. The movable portion vibrates relative to the fixed portion at a frequency that is lower than the maximum frequency, and the control signal includes a first driving signal provided to the first driving unit, a second driving signal provided to the second driving unit, a third driving signal provided to the third driving unit, and a fourth driving signal provided to the fourth driving unit. The first driving signal, the second driving signal, the third driving signal, and the fourth driving signal do not include a periodic signal with a frequency higher than 10000 Hz. After the control assembly receives an environmental signal provided by an environmental sensing assembly, the control signal is provided to the driving assembly by the control assembly, and the control assembly removes the high-frequency signal from the environmental signal after the control assembly receives the environmental signal. The environmental sensing assembly is used for detecting the influence of the environment on the driving mechanism, and the environmental sensing assembly includes an inertia sensing element.

In some embodiments, the first driving element is used for driving the movable portion to move relative to the fixed portion along the first dimension, the second driving element is used for driving the movable portion to move relative to the fixed portion along the second dimension. The first driving signal, the second driving signal, the third driving signal, and the fourth driving signal do not include periodic signal having a frequency higher than the maximum frequency. The control assembly removes a portion of the environmental signal that has a frequency higher than 10000 Hz after the control assembly receives the environmental signal. The control assembly controls the driving assembly according to a preparation mode, a first control mode, a second control mode, a third control mode, or a fourth control mode. During the preparation mode, the control assembly drives the driving assembly according to the position signal to position the movable portion at a predetermined position relative to the fixed portion. During the preparation mode, the first driving signal does not include a periodic signal with a frequency higher than 10000 Hz. During the preparation mode, the control signal does not include a periodic signal with a frequency higher than 10000 Hz. During the preparation mode, the first driving signal has a voltage or a current higher than 0 at any time. During the preparation mode, the second driving signal has a voltage or a current higher than 0 at any time. During the first control mode, the control assembly controls the driving assembly to drive the movable portion to move relative to the fixed portion in a first target direction. During the first control mode, the control assembly controls the driving assembly according to the first position signal. During the first control mode, the first driving signal has a voltage or a current higher than 0 at any time. During the first control mode, the second driving signal has a voltage or a current higher than 0 at any time. During the first control mode, the first driving signal does not include a periodic signal with a frequency higher than 10000 Hz. During the first control mode, the control signal does not include a periodic signal with a frequency higher than 10000 Hz. During the first control mode, the voltage or the current of the first driving signal is higher than the voltage or the current of the second driving signal. During the first control mode, the control assembly increases the voltage or the current of the first driving signal. During the first control mode, the control assembly decreases the voltage or the current of the second driving signal. During the first control mode, the control assembly increases the voltage or the current of the third driving signal. During the first control mode, the control assembly increases the voltage or the current of the fourth driving signal. During the second control mode, the control assembly controls the driving assembly to drive the movable portion to move relative to the fixed portion in a second target direction. During the second control mode, the control assembly controls the driving assembly according to the first position signal. During the second control mode, the first driving signal has a voltage or a current higher than 0 at any time. During the second control mode, the second driving signal has a voltage or a current higher than 0 at any time. During the second control mode, the first driving signal does not include a periodic signal with a frequency higher than 10000 Hz. During the second control mode, the control signal does not include a periodic signal with a frequency higher than 10000 Hz. During the second control mode, the control assembly increases the voltage or the current of the first driving signal. During the second control mode, the control assembly increases the voltage or the current of the second driving signal. During the second control mode, the control assembly decreases the voltage or the current of the third driving signal. During the second control mode, the control assembly decreases the voltage or the current of the fourth driving signal. During the third control mode, the control assembly controls the driving assembly according to the environmental signal. During the third control mode, the first driving signal has a voltage or a current higher than 0 at any time. During the third control mode, the second driving signal has a voltage or a current higher than 0 at any time. During the third control mode, the first driving signal does not include a periodic signal with a frequency higher than 10000 Hz. During the third control mode, the control signal does not include a periodic signal with a frequency higher than 10000 Hz. During the third control mode, the voltage or the current of the first driving signal is higher than the voltage or the current of the second driving signal. During the third control mode, the control assembly increases the voltage or the current of the first driving signal. During the third control mode, the control assembly decreases the voltage or the current of the second driving signal. During the third control mode, the control assembly decreases the voltage or the current of the third driving signal. During the third control mode, the control assembly decreases the voltage or the current of the fourth driving signal. During the fourth control mode, the control assembly controls the driving assembly according to the environmental signal. During the fourth control mode, the first driving signal has a voltage or a current higher than 0 at any time. During the fourth control mode, the second driving signal has a voltage or a current higher than 0 at any time. During the fourth control mode, the first driving signal does not include a periodic signal with a frequency higher than 10000 Hz. During the fourth control mode, the control signal does not include a periodic signal with a frequency higher than 10000 Hz. During the fourth control mode, the control assembly increases the voltage or the current of the first driving signal. During the fourth control mode, the control assembly increases the voltage or the current of the second driving signal. During the fourth control mode, the control assembly decreases the voltage or the current of the third driving signal. During the fourth control mode, the control assembly decreases the voltage or the current of the fourth driving signal.

In some embodiments, after the control assembly receives the environmental signal, the portion of the environmental signal that has a frequency higher than the maximum frequency is removed. The inertia sensing element includes an accelerometer or a gyroscope. During the preparation mode, the control assembly drives the first driving element according to the first position signal to position the movable portion at the predetermined position relative to the fixed portion. During the preparation mode, the control assembly drives the second driving element according to the second position signal to position the movable portion at the predetermined position relative to the fixed portion. During the preparation mode, the control signal does not include a periodic signal with a frequency higher than the maximum frequency. During the preparation mode, the first driving signal does not include a periodic signal with a frequency higher than the maximum frequency. During the first control mode, the control signal does not include a periodic signal with a frequency higher than the maximum frequency. During the first control mode, the first driving signal does not include a periodic signal with a frequency higher than the maximum frequency. During the first control mode, the absolute value of the voltage or the current of the first driving signal increased by the control assembly is different than the absolute value of the voltage or the current of the third driving signal increased by the control assembly. During the second control mode, the control signal does not include a periodic signal with a frequency higher than the maximum frequency. During the second control mode, the first driving signal does not include a periodic signal with a frequency higher than the maximum frequency. During the third control mode, the control assembly further controls the driving assembly according to the position signal. During the third control mode, the control signal does not include a periodic signal with a frequency higher than the maximum frequency. During the third control mode, the first driving signal does not include a periodic signal with a frequency higher than the maximum frequency. During the fourth control mode, the control assembly further controls the driving assembly according to the position signal. During the fourth control mode, the control signal does not include a periodic signal with a frequency higher than the maximum frequency. During the fourth control mode, the first driving signal does not include a periodic signal with a frequency higher than the maximum frequency.

In some embodiments, during the preparation mode, the control signal only includes DC voltage or DC current. During the preparation mode, the first driving signal only includes DC voltage or DC current. During the first control mode, the control signal only includes DC voltage or DC current. During the first control mode, the first driving signal only includes DC voltage or DC current. During the first control mode, the absolute value of the voltage or the current of the first driving signal increased by the control assembly is higher than the absolute value of the voltage or the current of the third driving signal increased by the control assembly. During the first control mode, the absolute value of the voltage or the current of the first driving signal increased by the control assembly is higher than the absolute value of the voltage or the current of the fourth driving signal increased by the control assembly. During the second control mode, the control signal only includes DC voltage or DC current. During the second control mode, the first driving signal only includes DC voltage or DC current. During the third control mode, the first driving signal only includes DC voltage or DC current. During the third control mode, the control signal only includes a periodic signal with a frequency that is identical to the frequency of the environmental signal. During the fourth control mode, the first driving signal only includes DC voltage or DC current. During the fourth control mode, the control signal only includes a periodic signal with a frequency that is identical to the frequency of the environmental signal.

In some embodiments, during the third control mode, the control signal only includes DC voltage or DC current. During the fourth control mode, the control signal only includes DC voltage or DC current. The optical assembly further includes: an inner fixed portion having a polygonal structure when viewed along the main axis, an inner movable portion used for connecting the optical element, and an inner driving assembly used for driving the inner movable portion to move relative to the inner fixed portion.

In some embodiments, the inner driving assembly is positioned at a first corner of the inner fixed portion. The first position sensor is positioned at a first side of the inner fixed portion or the first corner of the inner fixed portion, when the first position sensor is positioned at the first corner, and the inner driving assembly at least partially overlaps the first position sensor when viewed along the main axis. The control assembly is positioned outside the accommodation space, and the position sensing assembly is at least partially positioned outside the accommodation space.

In some embodiments, the inner driving assembly is positioned at a first side of the inner fixed portion. The first position sensor is positioned at a first corner of the inner fixed portion or the first side of the inner fixed portion, when the first position sensor is positioned at the first side, the inner driving assembly at least partially overlaps the first position sensor when viewed along the main axis. The control assembly and the first position sensor are formed as one piece.

In some embodiments, the inner driving assembly is positioned at a first side of the inner fixed portion or a first corner of the inner fixed portion. The first position sensor is positioned at a second side of the inner fixed portion or a second corner of the inner fixed portion, and the inner driving assembly does not overlap the first position sensor when viewed along the main axis. The entire position sensing assembly is positioned in the accommodation space.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
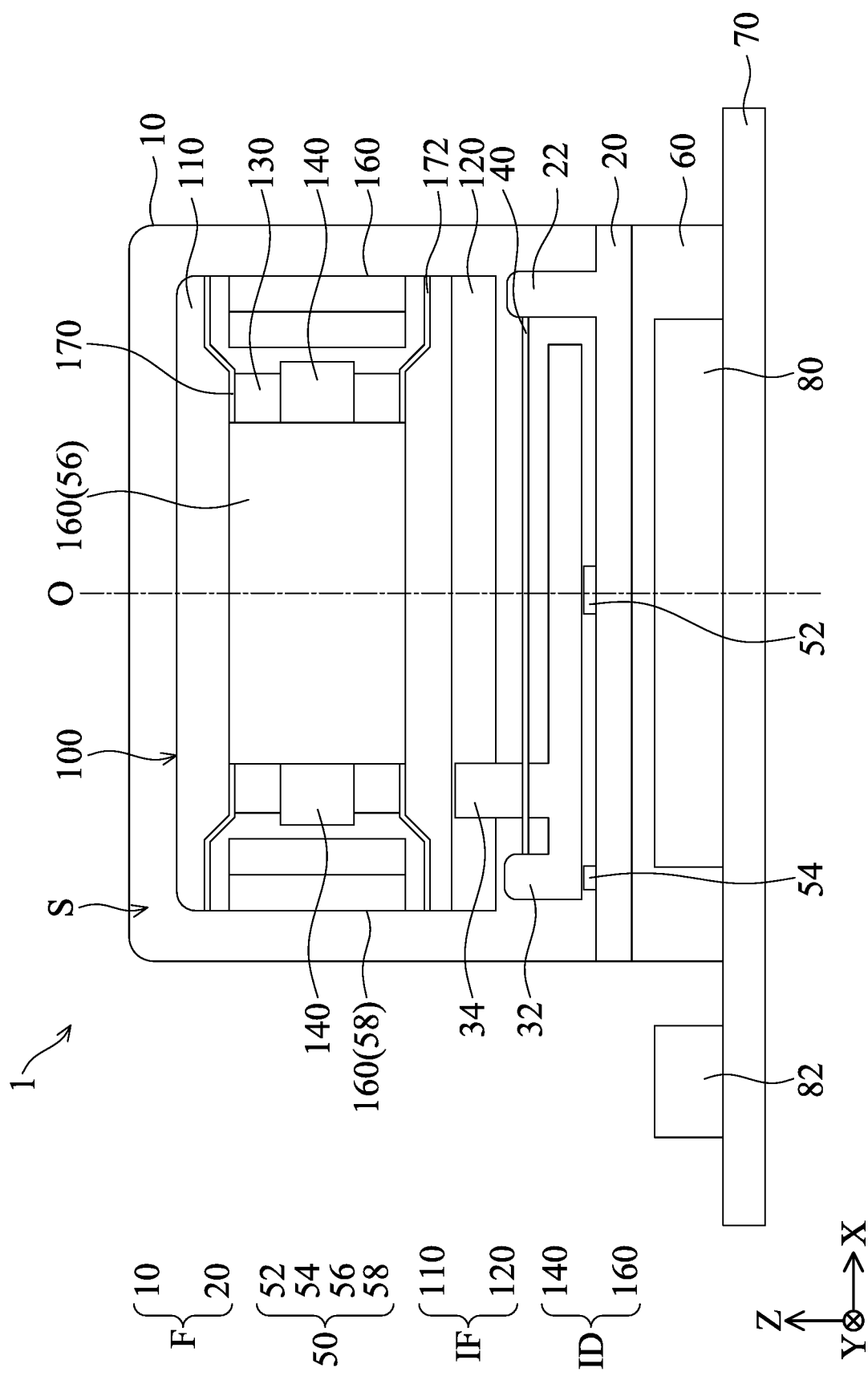
FIG. 1 is a schematic view of a driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

FIG. 1 is a schematic view of a driving mechanism 1 in some embodiments of the present disclosure. The driving mechanism 1 may mainly include a case 10, a base 20, a movable portion 30, a driving assembly 40, a position sensing assembly 50, a holder 60, a substrate 70, an optical sensor 80, and a control assembly 82.

The driving mechanism 1 may be used for driving an optical assembly 100, and the optical assembly 100 has a main axis O. In particular, the case 10 and the base 20 may be called as a fixed portion F, and an accommodation space S is formed in the case 10 and the base 20. The movable portion 30 and the optical assembly 100 are disposed in the accommodation space S. The movable portion 30 is movably connected to the fixed portion, and the optical assembly 100 is disposed on the movable portion 30. For example, the movable portion 30 may be connected to the optical assembly 100 through a connecting portion 34. Therefore, when the movable portion 30 is moving relative to the fixed portion F, the optical assembly 100 may be moved by the movable portion 30 to move relative to the fixed portion F. However, the present disclosure is not limited thereto. The driving mechanism also may be used for driving other mechanisms, such as vibration-typed motors, depending on design requirement.

Figure 2:
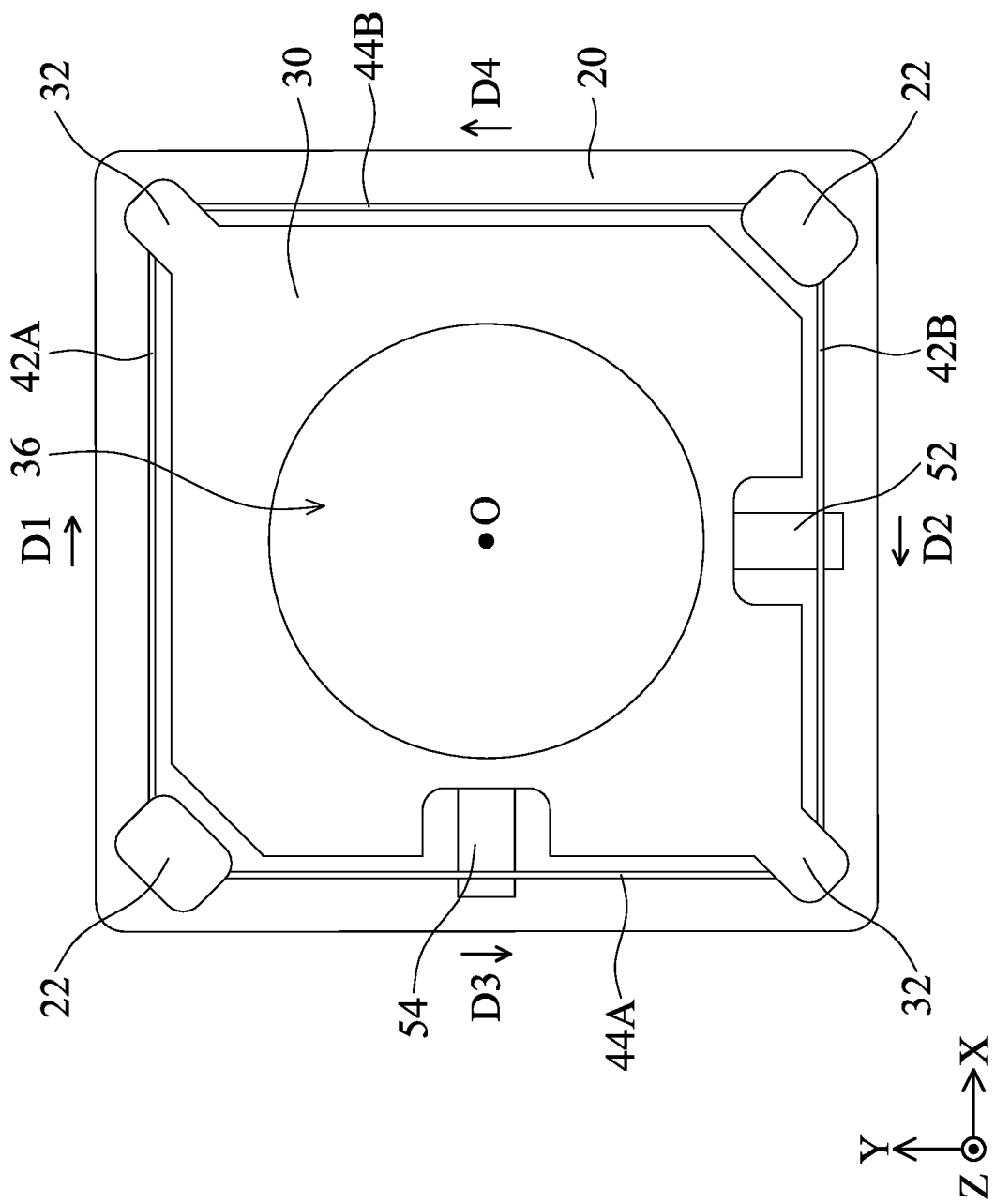
FIG. 2 is a top view of the base, the movable portion, and the driving assembly.

FIG. 2 is a top view of the base 20, the movable portion 30, and the driving assembly 40. In some embodiments, as shown in FIG. 2, the movable portion 30 has an opening 36, and the optical assembly 100 may be disposed in the opening 36. The driving assembly 40 may include a first driving element 42 and a second driving element 44, the first driving element 42 includes a first driving unit 42A and a second driving unit 42B, and the second driving element 44 includes a third driving unit 44A and a fourth driving unit 44B. The first driving unit 42A, the second driving unit 42B, the third driving unit 44A, and the fourth driving unit 44B are used for driving the movable portion 30 to move relative to the fixed portion F.

In some embodiments, the first driving unit 42A, the second driving unit 42B, the third driving unit 44A, and the fourth driving unit 44B are made of a shape memory alloy (SMA) and are strip-shaped. The length of the first driving unit 42A, the second driving unit 42B, the third driving unit 44A, or the fourth driving unit 44B changes as the crystal structure of SMA changes with temperature. From the center of the transition temperature, the length of the first driving unit 42A, the second driving unit 42B, the third driving unit 44A, or the fourth driving unit 44B increases as the temperature decreases, and the first driving unit 42A, the second driving unit 42B, the third driving unit 44A, or the fourth driving unit 44B contracts as the temperature increases. In some embodiments, when a signal (e.g. voltage or current) is provided to the first driving unit 42A, the second driving unit 42B, the third driving unit 44A, or the fourth driving unit 44B, the temperature may be increased by the thermal effect of a current, so that the length of the first driving unit 42A, the second driving unit 42B, the third driving unit 44A, or the fourth driving unit 44B may be decreased. Conversely, if a signal having a lower intensity is provided which makes the heating rate lower than the heat dissipation rate of the environment, the temperature of the first driving unit 42A, the second driving unit 42B, the third driving unit 44A, or the fourth driving unit 44B may be decreased, and the length may be increased.

As shown in FIG. 1 and FIG. 2, in some embodiments, the base 20 of the fixed portion F has an extension portion 22, the movable portion 30 has a protruding portion 32, an end of the driving assembly 40 may be disposed on the extension portion 22, and another end of the driving assembly 40 may be disposed on the protruding portion 32. As shown in FIG. 2, in some embodiments, the first driving unit 42A extends from the extension portion 22 to the protruding portion 32 in a first direction D1 (X direction), the second driving unit 42B extends from the extension portion 22 to the protruding portion 32 in a second direction D2 (−X direction), the third driving unit 44A extends from the extension portion 22 to the protruding portion 32 in a third direction D3 (−Y direction), the fourth driving unit 44B extends from the extension portion 22 to the protruding portion 32 in a fourth direction D4 (Y direction). The first direction D1 is different than the third direction D3, the second direction D2 is different than the third direction D3, the first direction D1 is substantially parallel to the second direction D2, and the third direction is substantially parallel to the fourth direction D4.

As a result, the movable portion 30 may be moved relative to the fixed portion F in different directions by controlling the lengths of the first driving unit 42A, the second driving unit 42B, the third driving unit 44A, and the fourth driving unit 44B. For example, the first driving element 42 may drive the movable portion 30 to move relative of the fixed portion F in a first dimension (X direction or −X direction), and the second driving element 44 may drive the movable portion 30 to move relative of the fixed portion F in a second dimension (Y direction or −Y direction). In other words, the driving assembly 40 may connect the fixed portion F and the movable portion 30 to drive the movable portion 30 moving relative to the fixed portion F.

The position sensing assembly 50 may include a first position sensor 52, a second position sensor 54, a first reference element 56, and a second reference element 58. The first position sensor 52 and the second position sensor 54 may be disposed on the fixed portion F (e.g. the base 20), and the first reference element 56 and the second reference element 58 may be disposed on the optical assembly 100. The first position sensor 52 corresponds to the first reference element 56 (e.g. align in Z direction), and the second position sensor 54 corresponds to the second reference element 58 (e.g. align in Z direction).

In some embodiments, the first position sensor 52 and the second position sensor 54 may be, for example, a Hall sensor, a magnetoresistance effect sensor (MR sensor), a giant magnetoresistance effect sensor (GMR Sensor), a tunneling a magnetoresistance effect sensor (TMR Sensor), or a fluxgate sensor.

In some embodiments, the first reference element 56 and the second reference element 58 may be sensing magnets, such as having a first magnetic unit and a second magnetic unit, respectively. When the movable portion 30 moves relative to the fixed portion F, the first position sensor 52 and the second position sensor 54 may detect the intensity difference of the magnetic field generated by the first reference element 56 and the second reference element 58, so the position of the movable portion 30 relative to the fixed portion F may be achieved.

In some embodiments, the position sensing assembly 50 is at least partially disposed in the accommodation space S, such as the whole position sensing assembly 50 is disposed in the accommodation space S, or there may be a portion of the position sensing assembly 50 disposed outside the accommodation space S, but the present disclosure is not limited thereto. As a result, the distance between the position sensing assembly 50 and the movable portion 30 may be decreased, so more accurate position information of the movable portion 30 may be achieved.

A holder 60 and a substrate 70 may be provided on another side of the base 20. The holder 60 may be disposed on the substrate 70, and the base 20 may be disposed on the holder 60. An optical sensor 80 may be disposed in the holder 60 to detect the light passing through the optical assembly 100. Furthermore, a control assembly 82 may be disposed on the substrate 70 to control the driving mechanism 1. Although the control assembly 82 is illustrated as disposed on the substrate 70, the present disclosure is not limited thereto. For example, the control assembly 82 may be separated from the driving mechanism 1. For example, when the driving mechanism 1 is disposed in an electronic apparatus (e.g. cell phone or tablets), the control assembly 82 may be the central processing unit (CPU) of the electronic apparatus, depending on design requirement.

Figure 3:
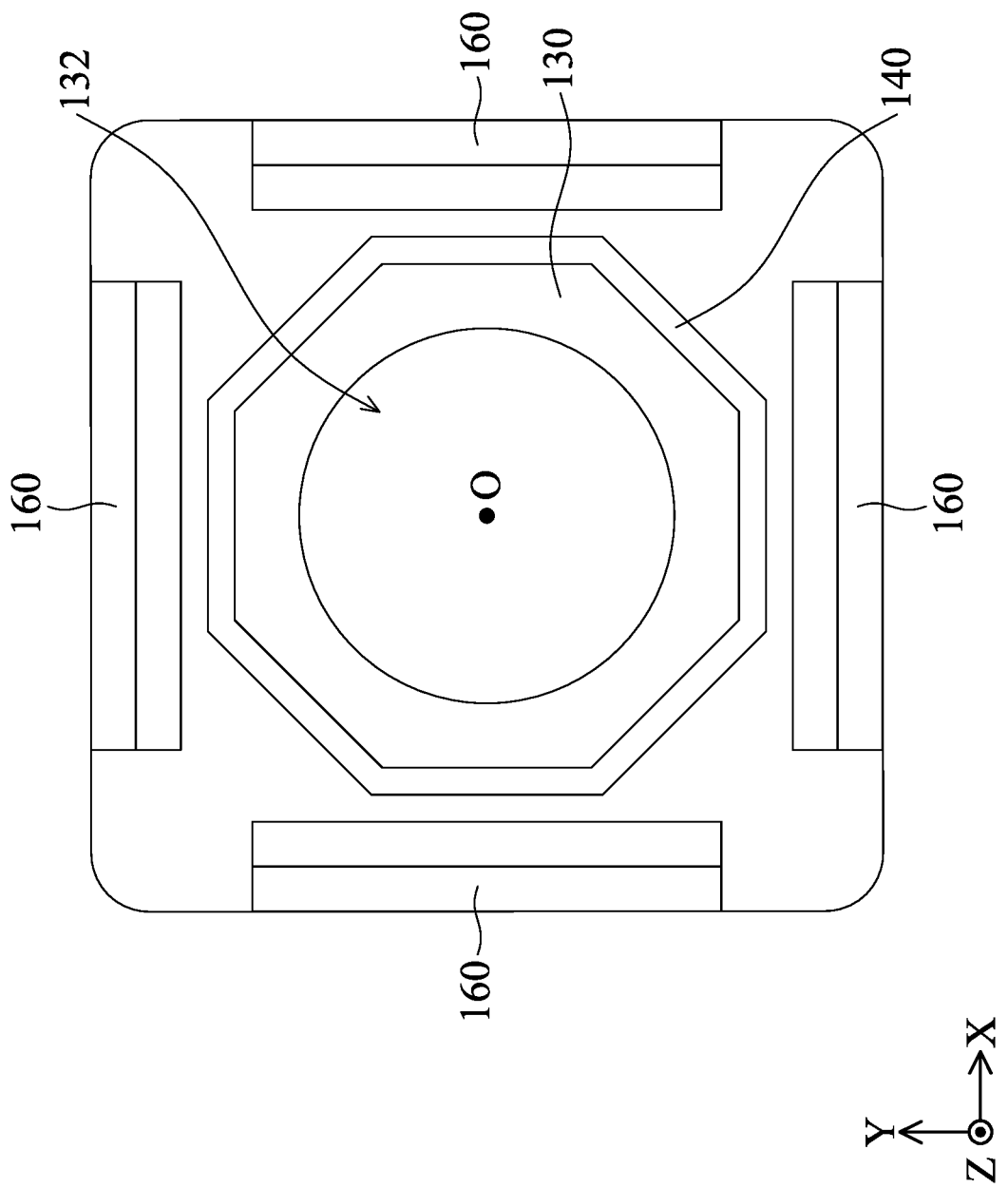
FIG. 3 is a top view of some elements of the optical assembly.

FIG. 3 is a top view of some elements of the optical assembly 100. Refer to FIG. 1 and FIG. 3, the optical assembly 100 includes a cover 110, a bottom 12, an inner movable portion 130, a first inner driving element 140, a second inner driving element 160, a first resilient element 170, and a second resilient element 172. Moreover, an optical element (not shown) may be disposed in the optical assembly 100, such as disposed on the inner movable portion 130. The optical element may include a lens, a mirror, a prism, a splitter, or an aperture. The optical assembly 100 may move the optical element to achieve auto focus (AF) or optical image stabilization (OIS).

The cover 110 and the bottom 120 may be called as an inner fixed portion IF. The cover 110 and the bottom 120 may be combined to form as the outer case of the optical assembly 100. For example, the bottom 120 may be fixed on the cover 110. It should be realized that an opening may be formed on the cover 110, and another opening may be formed on the bottom 120. The center of the opening of the cover 110 corresponds to the main axis O of the optical assembly 100, and the opening of the bottom 120 corresponds to the optical sensor 80 disposed outside the optical assembly 100. Therefore, the optical element disposed in the optical assembly 100 may perform focus to the optical sensor 80 along the main axis O.

A through hole may be formed on the inner movable portion 130, the optical element may be fixed in the through hole, and the first inner driving element 140 may be disposed on the outer surface of the inner movable portion 130. The second inner driving element 160 may be affixed on the cover 110. It should be noted that in this embodiment, the second inner driving element 160 and the first reference element 56 or the second reference element 58 are the same magnetic element. In other words, the second inner driving element 160 may be used for driving the inner movable portion 130, and may act as the first reference element 56 and the second reference element 58 as well, so that the position of the optical assembly 100 may be detected by the first position sensor 52 and the second position sensor 54. Therefore, the number of the elements in the driving mechanism 1 may be reduced to achieve miniaturization.

The first inner driving element 140 and the second inner driving element 160 may be called as the inner driving assembly ID to drive the inner movable portion 130 to move relative to the inner fixed portion IF. It should be realized that the interaction between the second inner driving element 160 and the first inner driving element 140 may generate a magnetic force to move the inner movable portion 130 relative to the inner fixed portion IF along the main axis O, so fast focus may be achieved.

In this embodiment, the inner movable portion 130 and the optical element disposed therein are movably disposed in the inner fixed portion IF. More specifically, the inner movable portion 130 may be connected to the inner fixed portion IF and suspended in the inner fixed portion IF (FIG. 3) through the first resilient element 170 and the second resilient element 172 including metal material. When current is passed through the first inner driving element 140, the first inner driving element 140 may interact with the magnetic field of the second inner driving element 160 to generate an electromagnetic force. As a result, the inner movable portion 130 and the optical element may be moved relative to the inner fixed portion IF along the main axis O to achieve auto focus.

In some embodiments, additional circuit may be provided on the bottom 120 to electrically connect to other electronic elements disposed in or outside the optical assembly 100 for auto focus or optical image stabilization. The circuit on the bottom 120 may transmit electric signal to the first inner driving element 140 through the first resilient element 170 or the second resilient element 172, so the movement of the inner movable portion 130 in X, Y, or Z direction may be controlled.

When the optical assembly 100 is assembled, the second resilient element 172 and the bottom 120 may be combined by soldering or laser welding to allow the first inner driving element 140 being electrically connected to external circuit.

Moreover, in some embodiments, a plurality of additional driving coils (not shown) may be embedded in the bottom 120 to interact with the second inner driving element 160, so the inner movable portion 130 may be moved. When the first inner driving element 140 and the additional driving coils in the bottom 120 interact with the second inner driving element 160, driving forces having different directions may be generated to achieve auto focus and optical image stabilization.

Figure 4:
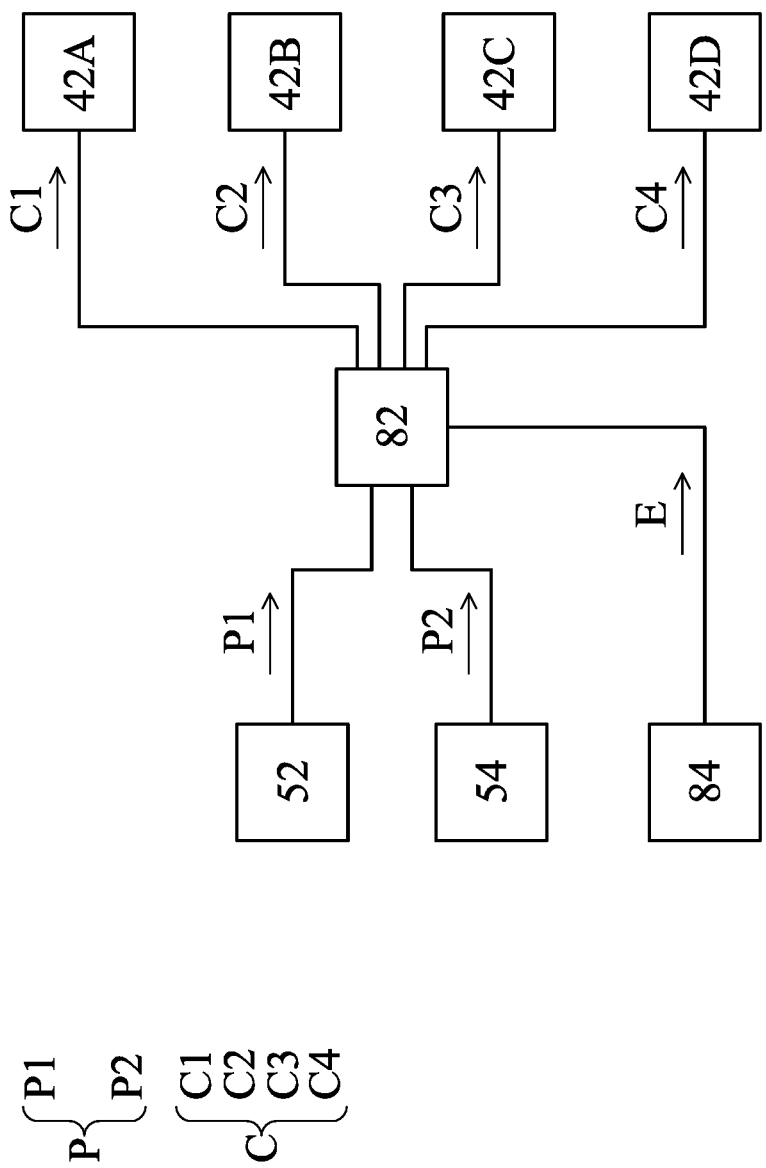
FIG. 4 is a block diagram showing the connection of some elements of the driving mechanism.

FIG. 4 is a block diagram showing the connection of some elements of the driving mechanism 1. In some embodiments, as shown in FIG. 4, the control assembly 82 may provide a control signal C to the driving assembly 40, so that the driving assembly 40 may be driven by the control signal C from the control assembly 82. The position sensing assembly 50 may provide a position signal P (e.g. including a first position signal P1 and a second position signal P2) to the control assembly 82. For example, the first position sensor 52 may provide the first position signal P1 to the control assembly 82, and the second position sensor 54 may provide the second position signal P2 to the control assembly 82. The first position signal P1 and the second position signal P2 may include the position information of the movable portion 30 relative to the fixed portion F in different dimensions. Therefore, the control assembly 82 may provide a control signal C to the driving assembly 40 corresponding to the position signal P provided by the position sensing assembly 50, so the position of the movable portion 30 relative to the fixed portion F may be controlled by the driving assembly 40.

In some embodiments, the control signal C may include a first driving signal C1 provided to the first driving unit 42A, a second driving signal C2 provided to the second driving unit 42B, a third driving signal C3 provided to the third driving unit 44A, and a fourth driving signal C4 provided to the fourth driving unit 44B to separately drive the first driving unit 42A, the second driving unit 42B, the third driving unit 44A, and the fourth driving unit 44B. In some embodiments, the first driving signal C1, the second driving signal C2, the third driving signal C3, and the fourth driving signal C4 may include periodic signal having a lower frequency than the maximum frequency. In other words, the first driving signal C1, the second driving signal C2, the third driving signal C3, and the fourth driving signal C4 does not include the periodic signal having a frequency higher than the maximum frequency, so that the movable portion 30 may vibrate relative to the fixed portion F by a frequency less than the maximum frequency. In some embodiments, the maximum frequency may be, for example, about 10000 Hz, and the first driving signal C1, the second driving signal C2, the third driving signal C3, and the fourth driving signal C4 does not include the periodic signal having a frequency higher than 10000 Hz, but the present disclosure is not limited thereto. As a result, other elements in the driving mechanism 1 may be prevented from being interfered by the signal with a frequency that is too high. In some embodiments, the frequency of the first driving signal C1, the second driving signal C2, the third driving signal C3, and the fourth driving signal C4 may be less than the maximum response frequency of the driving mechanism to effectively drive the driving mechanism 1.

In some embodiments, the driving mechanism 1 may also include an environment sensing assembly 84 (shown in FIG. 4), which may be disposed on the substrate 70 to detect the influence of the environment on the driving mechanism 1, and then provide an environmental signal E to the control assembly 82. The control assembly 82 may provide the first driving signal C1, the second driving signal C2, the third driving signal C3, and the fourth driving signal C4 based on the environmental signal E. In some embodiments, the environment sensing assembly 84 may include an inertia sensing element, such as a gyroscope, an accelerometer, an angular velocity meter, or a gravity direction sensor, etc., to detect the inertia of the driving mechanism 1.

In some embodiments, after receiving the environmental signal E, the control assembly 82 filters and removes the high-frequency signals in the environmental signal E to prevent the environmental signal E being interfered by high-frequency noise. For example, signals in the environmental signal E with a frequency higher than 10000 Hz may be removed, or signals with a frequency higher than the maximum frequency may be removed.

Figure 5:
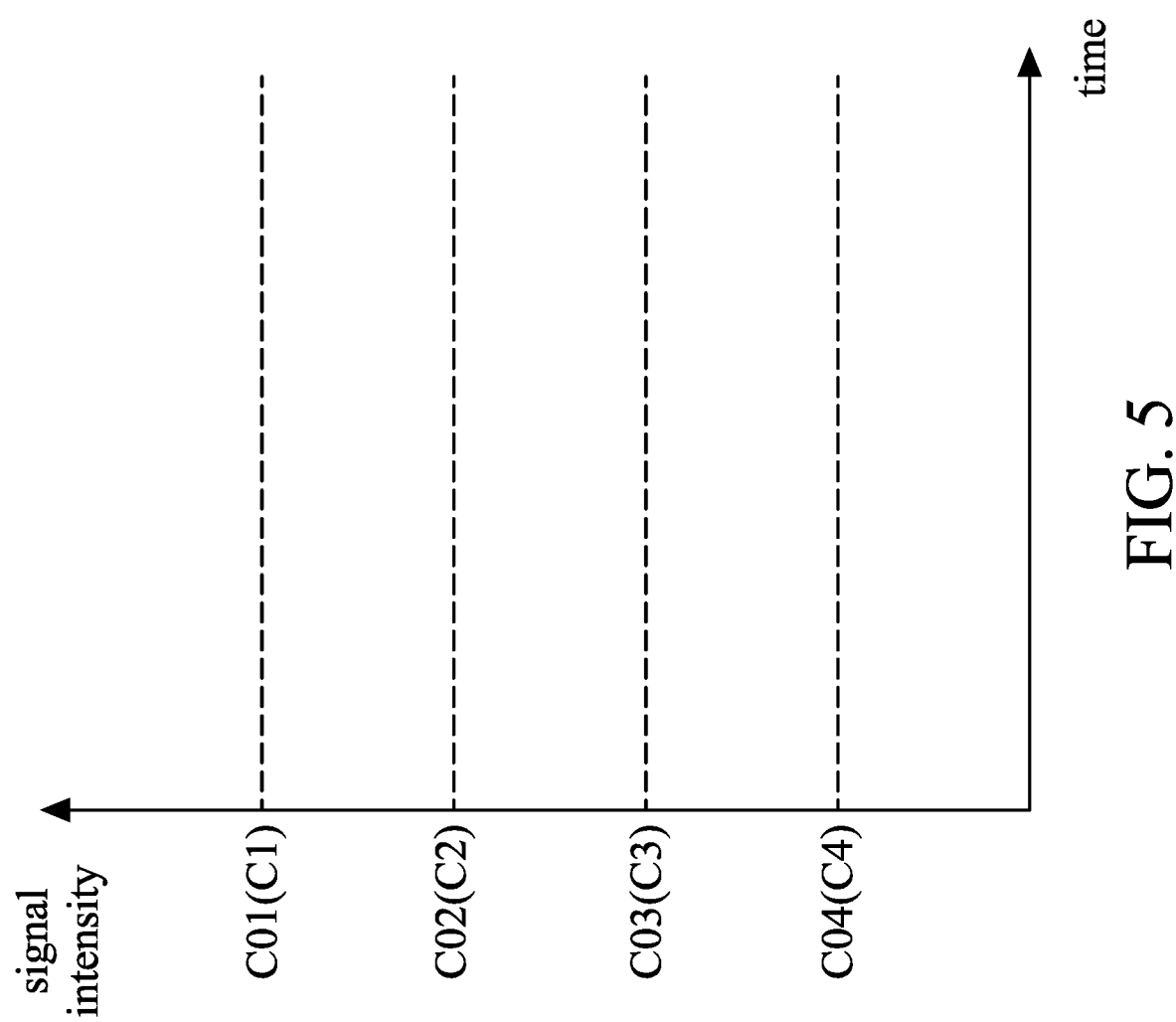
FIG. 5 is a schematic view of the control signal of the control assembly under a preparation mode.

Next, how the control assembly 82 controls the driving assembly 40 is described. FIG. 5 is a schematic view of the control signal C when the control assembly 82 is in a preparation mode. At this time, the control assembly 82 drives the driving assembly 40 according to the position signal P, so that the movable portion 30 is positioned at a predetermined position relative to the fixed portion F (as shown in FIG. 2). For example, at this time, the control assembly 82 may drive the first driving element 42A according to the first position signal P1, and may drive the second driving element 42B according to the second position signal P2, so that the movable portion 30 is at the predetermined position relative to the fixed portion F. Also, as an applied driving method, the first driving signal C1 and the second driving signal C2 may be calculated based on the first position signal P1 to control the first driving element 42, that is, the first driving unit 42A and the second driving unit 42B. The third driving signal C3 and the fourth driving signal C4 may be calculated based on the second position signal P2 to control the second driving element 44, that is, the third driving unit 44A and the fourth driving unit 44B. It should be noted that at this time, the control signal C (for example, the first driving signal C1, the second driving signal C2, the third driving signal C3, or the fourth driving signal C4) does not include a periodic signal with a frequency higher than the maximum frequency (e.g. higher than 10000 Hz). For example, the control signal C may only include a DC signal (e.g. DC current or DC voltage).

As shown in FIG. 5, at this time, the signal intensities of the first driving signal C1, the second driving signal C2, the third driving signal C3, or the fourth driving signal C4 are respectively shown as overlapped to a first original intensity C01, a second original intensity C02, a third original intensity C03, and a fourth original intensity C04, respectively. However, it should be noted that at this time, the first original intensity C01, the second original intensity C02, and the third original intensity C03, and the fourth original intensity C04 of the first driving signal C1, the second driving signal C2, the third driving signal C3, and the fourth driving signal C4 are voltages or currents higher than zero. In other words, in the preparation mode, the intensities (such as voltage or current) of the first driving signal C1, the second driving signal C2, the third driving signal C3, and the fourth driving signal C4 are higher than zero, so that a voltage or current that is not equal to zero passes through the first driving unit 42A, the second driving unit 42B, the third driving unit 44A, and the fourth driving unit 44B. In this way, the probability of occurrence of surges may be reduced. Since the surge includes high-frequency signals, if the probability of occurrence of surge is reduced, high-frequency noise may be reduced, thereby reducing the probability of noise generated when the driving mechanism 1 operating. It should be noted that under this condition, the heating rate of the control signal C to the driving assembly 40 is less than the heat dissipation rate of the environment to the driving assembly 40, so the temperature of the driving assembly 40 will not keep increase, but will be maintained at a basic temperature.

Figure 6A:
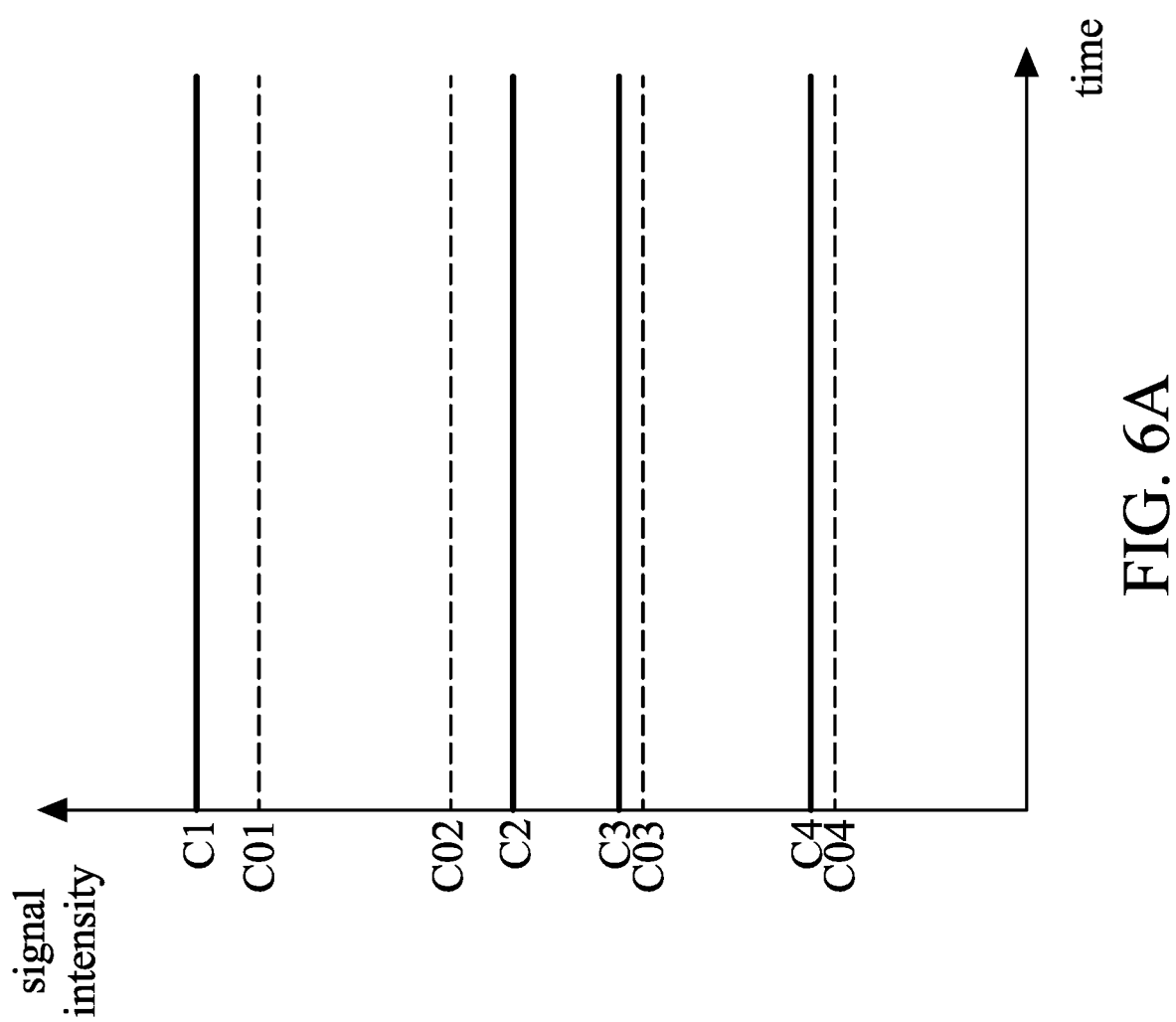
FIG. 6A is a schematic view of the control signal of the control assembly under a first control mode.
Figure 6B:
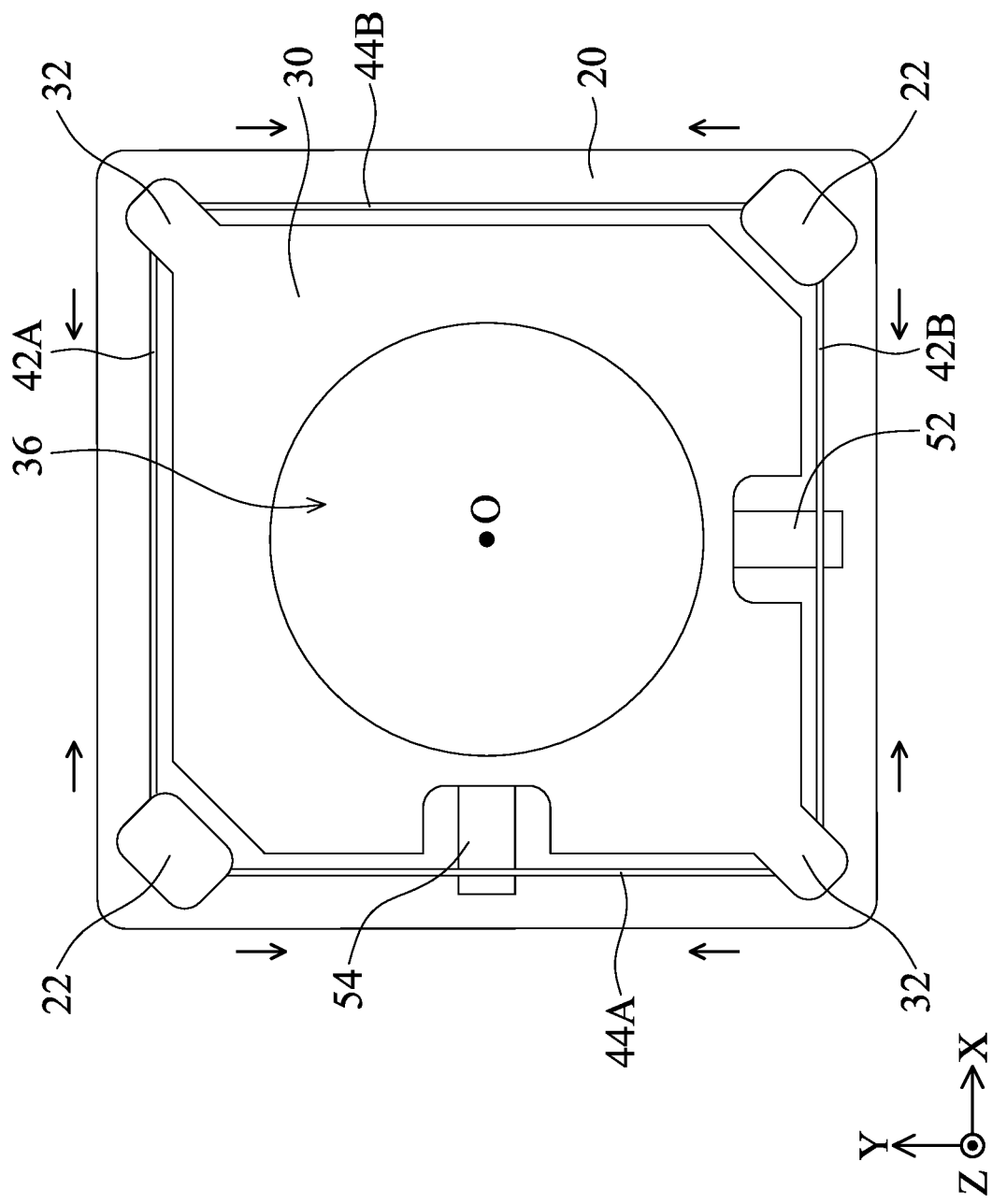
FIG. 6B is a schematic view showing the tension differences of the first driving unit, the second driving unit, the third driving unit, and the fourth driving unit between the first control mode and the preparation mode in FIG. 5

FIG. 6A is a schematic view of the control signal C when the control assembly 82 is in the first control mode, and FIG. 6B is a schematic view showing the tension differences of the first driving unit 42A, the second driving unit 42B, the third driving unit 42C, and the fourth driving unit 42D between the first control mode and the preparation mode in FIG. 5. In the first control mode, the control assembly 82 controls the driving assembly 40 to drive the movable portion 30 to move in a first target direction relative to the fixed portion F. This embodiment uses the −X direction as an example, but it is not limited thereto. In the first control mode, the control assembly 82 may control the driving assembly 40 according to the first position signal P1 and the second position signal P2.

As shown in FIG. 6A, during the first control mode, the first driving signal C1, the second driving signal C2, the third driving signal C3, and the fourth driving signal C4 have intensities (such as voltage or current) higher than zero. At this time, the intensity of the first driving signal C1 is higher than the first original intensity C01, the intensity of the second driving signal C2 is less than the second original intensity C02, the intensity of the third driving signal C3 is higher than the third original intensity C03, and the intensity of the fourth driving signal C4 is higher than the fourth original intensity C04. In other words, when compared to the preparation mode, the control assembly 82 increases the voltage or current of the first driving signal C1, decreases the voltage or current of the second driving signal C2, increases the voltage or current of the third driving signal C3, and increases the voltage or current of the fourth driving signal C4 in the first control mode. As a result, as shown in FIG. 6B, when compared to the preparation mode, the tension of the first driving unit 42A increases, the tension of the second driving unit 42B decreases, the tension of the third driving unit 44A increases, and the tension of the fourth driving unit 44B increases in the first control mode, so that the movable portion 30 may be driven to move in the −X direction.

In some embodiments, in the first control mode, the voltage or current of the first driving signal C1 is higher than the voltage or current of the second driving signal C2. For example, as shown in FIG. 6A, the intensity of the first driving signal C1 is higher than the first original intensity C01, and the intensity of the second driving signal C2 is less than the second original intensity C02. In some embodiments, the first original intensity C01 may be substantially equal to the second original intensity C02, so the voltage or current of the first driving signal C1 may be higher than the voltage or current of the second driving signal C2. In other words, the tension of the first driving unit 42A increases, and the tension of the second driving unit 42B decreases, whereby a force in the −X direction may be applied to the movable portion 30 to move the movable portion 30 in the −X direction.

In the first control mode, the control signal C (including the first driving signal C1, the second driving signal C2, the third driving signal C3, and the fourth driving signal C4) does not include a periodic signal with a frequency higher than the maximum frequency (for example, 10000 Hz). In this way, the elements of the driving mechanism 1 may be prevented from being interfered by signals with high frequencies. In some embodiments, as shown in FIG. 6A, in the first control mode, the first driving signal C1, the second driving signal C2, the third driving signal C3, and the fourth driving signal C4 only have a DC voltage or DC current rather than AC voltage or AC current. In other words, in the first control mode, the intensities of the first driving signal C1, the second driving signal C2, the third driving signal C3, and the fourth driving signal C4 are substantially constants. In this way, the element of the driving mechanism 1 may be protected from interference by signals with excessive frequencies.

In some embodiments, in the first control mode, the absolute value of the voltage or current of the first driving signal C1 increased by the control assembly 82 (i.e. the absolute value of the intensity difference between the first driving signal C1 and the first original intensity C01) is different than the absolute value of the voltage or current of the third driving signal C3 increased by the control assembly 82 (i.e. the absolute value of the intensity difference between the third driving signal C3 and the third original intensity C03). For example, as shown in FIG. 6A, the absolute value of the voltage or current of the first driving signal C1 increased by the control assembly 82 may be higher than the absolute value of the voltage or current of the third driving signal C3 increased by the control assembly 82, that is, the intensity difference between the first driving signal C1 and the first original intensity C01 may be higher than the intensity difference between the third driving signal C3 and the third original intensity C03. Thereby, the first driving unit 42A receiving the first driving signal C1 may generate a higher driving force than the third driving unit 44A receiving the third driving signal C3 to control the moving direction of the movable portion 30. In some embodiments, in the first control mode, the absolute value of the intensity difference between the first driving signal C1 and the first original intensity C01 is about 2 times of the absolute value of the intensity difference between the third driving signal C3 and the third original intensity C03, but the present disclosure is not limited thereto.

In addition, in some embodiments, the absolute value of the voltage or current of the first driving signal C1 increased by the control assembly 82 (i.e. the absolute value of the difference between the first driving signal C1 and the first original intensity C01) is different than the absolute value of the voltage or current of the fourth driving signal C4 increased by the control assembly 82 (i.e. the absolute value of the difference between the fourth driving signal C4 and the fourth original intensity C04) in the first control mode. For example, as shown in FIG. 6A, the absolute value of the voltage or current of the first driving signal C1 increased by the control assembly 82 may be higher than the absolute value of the voltage or current of the fourth driving signal C4 increased by the control assembly 82. In other words, the absolute value of the difference between the first driving signal C1 and the first original intensity C01 may be higher than the absolute value of the difference between the fourth driving signal C4 and the fourth original intensity C04. Thereby, when compared with the fourth driving unit 44B which receives the fourth driving signal C4, the first driving unit 42A which receives the first driving signal C1 may generate a higher driving force to control the moving direction of the movable portion 30. In some embodiments, the absolute value of the difference between the first driving signal C1 and the first original intensity C01 is about 2 times of the absolute value of the difference between the fourth driving signal C4 and the fourth original intensity C04 in the first control mode, but the present disclosure is not limited thereto.

In some embodiments, the intensity difference between the third driving signal C3 and the third original intensity C03 may be substantially equal to the intensity difference between the fourth driving signal C4 and the fourth original intensity C04 in the first control mode. In other words, the net force received by the movable portion 30 in the Y direction is about 0 at this time, and the force applied on the movable portion 30 by the third driving unit 44A and the fourth driving unit 44B may be balanced to stabilize the movable portion 30 in the Y direction.

Therefore, the first driving element 42 may be used to drive the movable portion 30 to move in the −X direction, and the second driving element 44 may be used to prevent the movable portion 30 from rotating during translation to stabilize the movable portion 30.

Figure 7A:
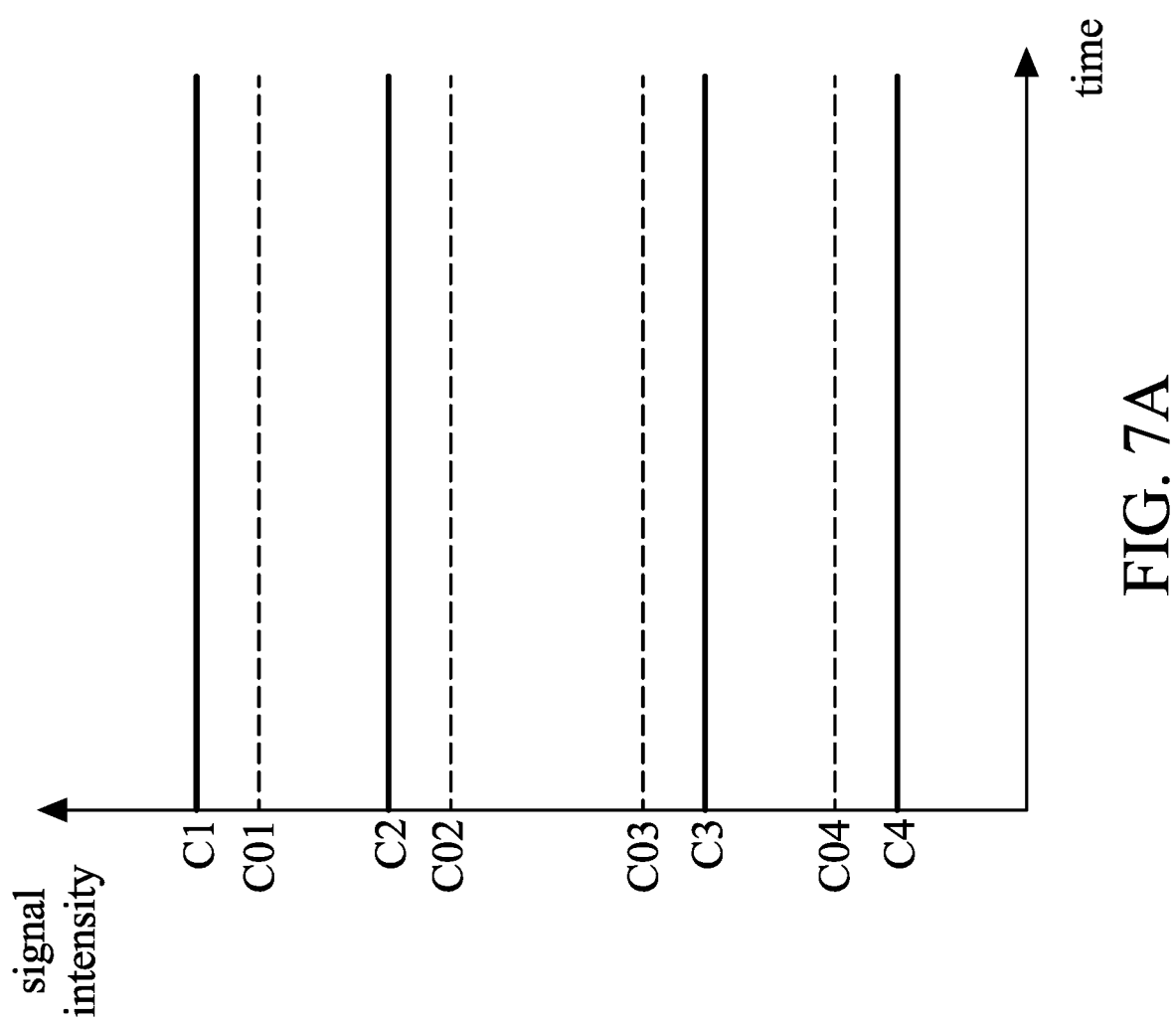
FIG. 7A is a schematic view of the control signal of the control assembly under a second control mode.
Figure 7B:
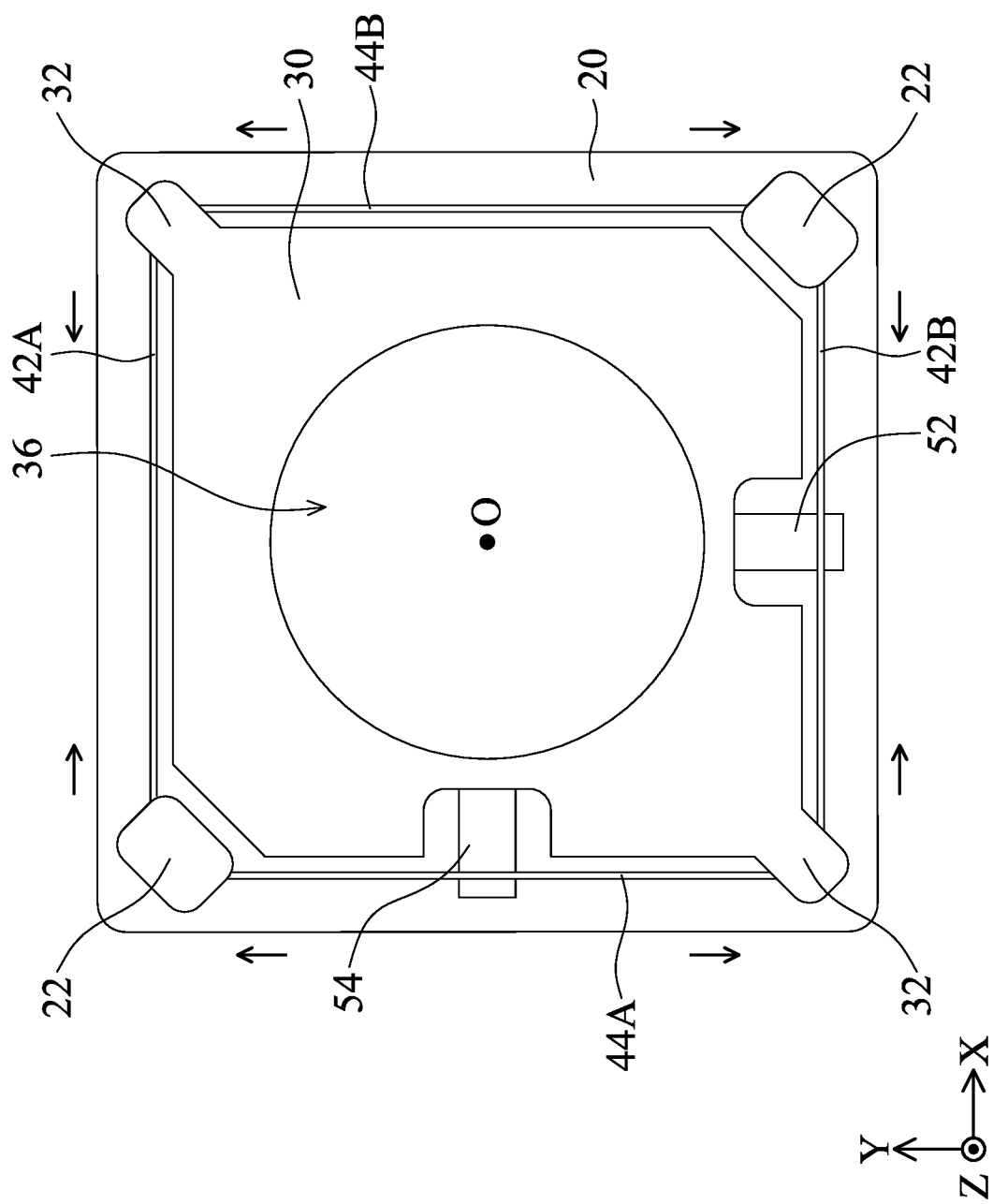
FIG. 7B is a schematic view showing the tension differences of the first driving unit, the second driving unit, the third driving unit, and the fourth driving unit between the second control mode and the preparation mode in FIG. 5

In addition, the control assembly 82 further includes a second control mode for controlling the driving assembly 40. FIG. 7A is a schematic view of the control signal C of the control assembly 82 in the second control mode, and FIG. 7B is a schematic view showing the tension differences of the first driving unit 42A, the second driving unit 42B, the third driving unit 44A, and the fourth driving unit 44B between the second control mode and the preparation mode in FIG. 5. In the second control mode, the control assembly 82 controls the driving assembly 40 to move the movable portion 30 relative to the fixed portion F in a second target direction. Counterclockwise rotation is used as an example in this embodiment, but it is not limited thereto. In the second control mode, the control assembly 82 may control the driving assembly 40 according to the first position signal P1 and the second position signal P2.

As shown in FIG. 7A, during the second control mode, the first driving signal C1, the second driving signal C2, the third driving signal C3, and the fourth driving signal C4 have intensities (such as voltage or current) higher than zero. At this time, the intensity of the first driving signal C1 is higher than the first original intensity C01, the intensity of the second driving signal C2 is higher than the second original intensity C02, the intensity of the third driving signal C3 is less than the third original intensity C03, and the intensity of the fourth driving signal C4 is less than the fourth original intensity C04. In other words, when compared to the preparation mode, the control assembly 82 increases the voltage or current of the first driving signal C1, increases the voltage or current of the second driving signal C2, decreases the voltage or current of the third driving signal C3, and decreases the voltage or current of the fourth driving signal C4 in the second control mode. As a result, as shown in FIG. 7B, when compared to the preparation mode, the tension of the first driving unit 42A increases, the tension of the second driving unit 42B increases, the tension of the third driving unit 44A decreases, and the tension of the fourth driving unit 44B decreases in the second control mode, so that the movable portion 30 may be driven to rotate in the counterclockwise direction.

In the second control mode, the control signal C (including the first driving signal C1, the second driving signal C2, the third driving signal C3, and the fourth driving signal C4) does not include a periodic signal with a frequency higher than the maximum frequency (for example, 10000 Hz). In this way, the elements of the driving mechanism 1 may be prevented from being interfered by signals with high frequencies. In some embodiments, as shown in FIG. 7A, in the second control mode, the first driving signal C1, the second driving signal C2, the third driving signal C3, and the fourth driving signal C4 only have a DC voltage or DC current rather than AC voltage or AC current. In other words, in the second control mode, the intensities of the first driving signal C1, the second driving signal C2, the third driving signal C3, and the fourth driving signal C4 are substantially constants. In this way, the element of the driving mechanism 1 may be protected from interference by signals with excessive frequencies.

Figure 8A:
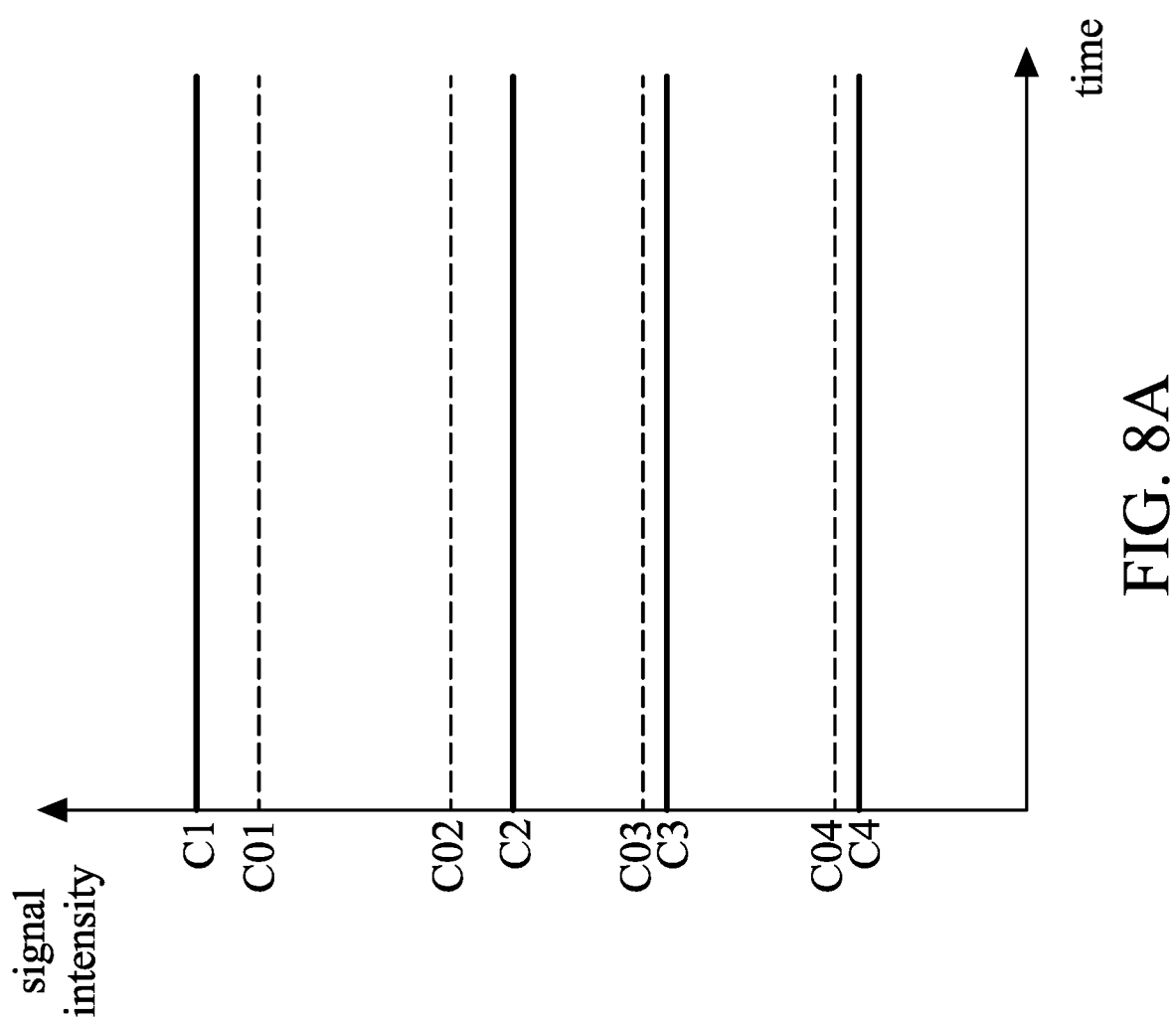
FIG. 8A is a schematic view of the control signal of the control assembly under a third control mode.
Figure 8B:
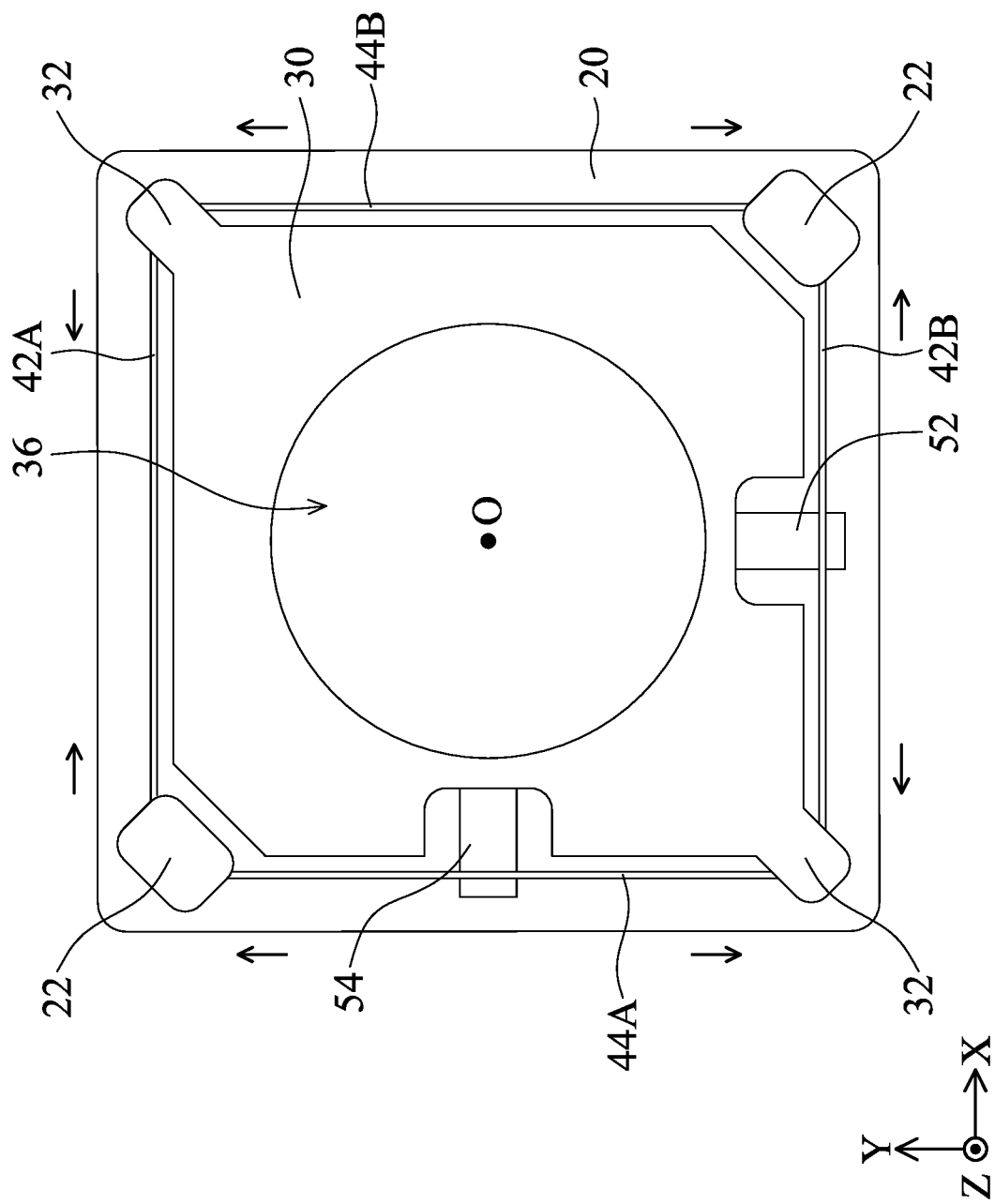
FIG. 8B is a schematic view showing the tension differences of the first driving unit, the second driving unit, the third driving unit, and the fourth driving unit between the third control mode and the preparation mode in FIG. 5.

In addition, the control assembly 82 further includes a third control mode for controlling the driving assembly 40. FIG. 8A is a schematic view of the control signal C of the control assembly 82 in the third control mode, and FIG. 8B is a schematic view showing the tension differences of the first driving unit 42A, the second driving unit 42B, the third driving unit 44A, and the fourth driving unit 44B between the third control mode and the preparation mode in FIG. 5. In the third control mode, the control assembly 82 controls the driving assembly 40 to move the movable portion 30 relative to the fixed portion F in a first target direction. −X direction is used as an example in this embodiment, but it is not limited thereto. In the third control mode, unlike the first control mode, the control assembly 82 not only controls the driving assembly 40 according to the position signal P (for example, including the first position signal P1 and the second position signal P2), but also controls the driving assembly 40 according to the environmental signal E. Thereby, the influence of the environment on the driving mechanism 1 may be reduced, and optical image stabilization may be achieved by translational movement.

As shown in FIG. 8A, during the third control mode, the first driving signal C1, the second driving signal C2, the third driving signal C3, and the fourth driving signal C4 have intensities (such as voltage or current) higher than zero. At this time, the intensity of the first driving signal C1 is higher than the first original intensity C01, the intensity of the second driving signal C2 is less than the second original intensity C02, the intensity of the third driving signal C3 is less than the third original intensity C03, and the intensity of the fourth driving signal C4 is less than the fourth original intensity C04. In other words, when compared to the preparation mode, the control assembly 82 increases the voltage or current of the first driving signal C1, decreases the voltage or current of the second driving signal C2, decreases the voltage or current of the third driving signal C3, and decreases the voltage or current of the fourth driving signal C4 in the third control mode. As a result, as shown in FIG. 7B, when compared to the preparation mode, the tension of the first driving unit 42A increases, the tension of the second driving unit 42B decreases, the tension of the third driving unit 44A decreases, and the tension of the fourth driving unit 44B decreases in the third control mode, so that the movable portion 30 may be driven to rotate in the −X direction.

Moreover, the required energy of the driving mechanism 1 may be decreased by decreasing the tensions of the third driving unit 44A and the fourth driving unit 44B to save energy.

In some embodiments, in the third control mode, the voltage or current of the first driving signal C1 is higher than the voltage or current of the second driving signal C2. For example, as shown in FIG. 8A, the intensity of the first driving signal C1 is higher than the first original intensity C01, and the intensity of the second driving signal C2 is less than the second original intensity C02. In some embodiments, the first original intensity C01 may be substantially equal to the second original intensity C02, so the voltage or current of the first driving signal C1 may be higher than the voltage or current of the second driving signal C2. In other words, the tension of the first driving unit 42A increases, and the tension of the second driving unit 42B decreases, whereby a force in the −X direction may be applied to the movable portion 30 to move the movable portion 30 in the −X direction.

In the second control mode, the control signal C (including the first driving signal C1, the second driving signal C2, the third driving signal C3, and the fourth driving signal C4) does not include a periodic signal with a frequency higher than the maximum frequency (for example, 10000 Hz). Alternatively, in some embodiments, the control signal C only has a periodic signal with identical frequency to the environmental signal E in the third control mode. In this way, the elements of the driving mechanism 1 may be prevented from being interfered by signals with high frequencies. In some embodiments, as shown in FIG. 8A, in the third control mode, the first driving signal C1, the second driving signal C2, the third driving signal C3, and the fourth driving signal C4 only have a DC voltage or DC current rather than AC voltage or AC current. In other words, in the first control mode, the intensities of the first driving signal C1, the second driving signal C2, the third driving signal C3, and the fourth driving signal C4 are substantially constants. In this way, the element of the driving mechanism 1 may be protected from interference by signals with excessive frequencies.

In some embodiments, in the third control mode, the absolute value of the voltage or current of the first driving signal C1 increased by the control assembly 82 (i.e. the absolute value of the intensity difference between the first driving signal C1 and the first original intensity C01) is different than the absolute value of the voltage or current of the third driving signal C3 increased by the control assembly 82 (i.e. the absolute value of the intensity difference between the third driving signal C3 and the third original intensity C03). For example, as shown in FIG. 8A, the absolute value of the voltage or current of the first driving signal C1 increased by the control assembly 82 may be higher than the absolute value of the voltage or current of the third driving signal C3 increased by the control assembly 82, that is, the intensity difference between the first driving signal C1 and the first original intensity C01 may be higher than the intensity difference between the third driving signal C3 and the third original intensity C03.

Thereby, the first driving unit 42A receiving the first driving signal C1 may generate a higher driving force than the third driving unit 44A receiving the third driving signal C3 to control the moving direction of the movable portion 30. In some embodiments, in the third control mode, the absolute value of the intensity difference between the first driving signal C1 and the first original intensity C01 is about 2 times of the absolute value of the intensity difference between the third driving signal C3 and the third original intensity C03, but the present disclosure is not limited thereto.

In addition, in some embodiments, the absolute value of the voltage or current of the first driving signal C1 increased by the control assembly 82 (i.e. the absolute value of the difference between the first driving signal C1 and the first original intensity C01) is different than the absolute value of the voltage or current of the fourth driving signal C4 increased by the control assembly 82 (i.e. the absolute value of the difference between the fourth driving signal C4 and the fourth original intensity C04) in the third control mode. For example, as shown in FIG. 8A, the absolute value of the voltage or current of the first driving signal C1 increased by the control assembly 82 may be higher than the absolute value of the voltage or current of the fourth driving signal C4 increased by the control assembly 82. In other words, the absolute value of the difference between the first driving signal C1 and the first original intensity C01 may be higher than the absolute value of the difference between the fourth driving signal C4 and the fourth original intensity C04. Thereby, when compared with the fourth driving unit 44B which receives the fourth driving signal C4, the first driving unit 42A which receives the first driving signal C1 may generate a higher driving force to control the moving direction of the movable portion 30. In some embodiments, the absolute value of the difference between the first driving signal C1 and the first original intensity C01 is about 2 times of the absolute value of the difference between the fourth driving signal C4 and the fourth original intensity C04 in the third control mode, but the present disclosure is not limited thereto.

Therefore, the first driving element 42 may drive the movable portion 30 to move in the −X direction. Since the intensity of the driving signal of the second driving element 44 is reduced, the energy required in the third control mode may be reduced to save energy.

In addition, the control assembly 82 further includes a fourth control mode for controlling the driving assembly 40. The fourth control mode is substantially similar to the second control mode, so please referring back to FIG. 7A and FIG. 7B. FIG. 7A is a schematic view of the control signal C of the control assembly 82 in the fourth control mode, and FIG. 7B is a schematic view showing the tension differences of the first driving unit 42A, the second driving unit 42B, the third driving unit 44A, and the fourth driving unit 44B between the fourth control mode and the preparation mode in FIG. 5. In the fourth control mode, the control assembly 82 controls the driving assembly 40 to move the movable portion 30 relative to the fixed portion F in a second target direction. Counterclockwise rotation is used as an example in this embodiment, but it is not limited thereto. In the second control mode, the control assembly 82 may control the driving assembly 40 according to the first position signal P1 and the second position signal P2. In the fourth control mode, unlike the second control mode, the control assembly 82 not only controls the driving assembly 40 according to the position signal P (for example, including the first position signal P1 and the second position signal P2), but also controls the driving assembly 40 according to the environmental signal E. Thereby, the influence of the environment on the driving mechanism 1 may be reduced, and optical image stabilization may be achieved by rotational movement.

As shown in FIG. 7A, during the fourth control mode, the first driving signal C1, the second driving signal C2, the third driving signal C3, and the fourth driving signal C4 have intensities (such as voltage or current) higher than zero. At this time, the intensity of the first driving signal C1 is higher than the first original intensity C01, the intensity of the second driving signal C2 is higher than the second original intensity C02, the intensity of the third driving signal C3 is less than the third original intensity C03, and the intensity of the fourth driving signal C4 is less than the fourth original intensity C04. In other words, when compared to the preparation mode, the control assembly 82 increases the voltage or current of the first driving signal C1, increases the voltage or current of the second driving signal C2, decreases the voltage or current of the third driving signal C3, and decreases the voltage or current of the fourth driving signal C4 in the fourth control mode. As a result, as shown in FIG. 7B, when compared to the preparation mode, the tension of the first driving unit 42A increases, the tension of the second driving unit 42B increases, the tension of the third driving unit 44A decreases, and the tension of the fourth driving unit 44B decreases in the fourth control mode, so that the movable portion 30 may be driven to rotate in the counterclockwise direction.

In the fourth control mode, the control signal C (including the first driving signal C1, the second driving signal C2, the third driving signal C3, and the fourth driving signal C4) does not include a periodic signal with a frequency higher than the maximum frequency (for example, 10000 Hz). In this way, the elements of the driving mechanism 1 may be prevented from being interfered by signals with high frequencies. In some embodiments, as shown in FIG. 7A, in the fourth control mode, the first driving signal C1, the second driving signal C2, the third driving signal C3, and the fourth driving signal C4 only have a DC voltage or DC current rather than AC voltage or AC current. In other words, in the fourth control mode, the intensities of the first driving signal C1, the second driving signal C2, the third driving signal C3, and the fourth driving signal C4 are substantially constants. In this way, the element of the driving mechanism 1 may be protected from interference by signals with excessive frequencies.

Figure 9A:
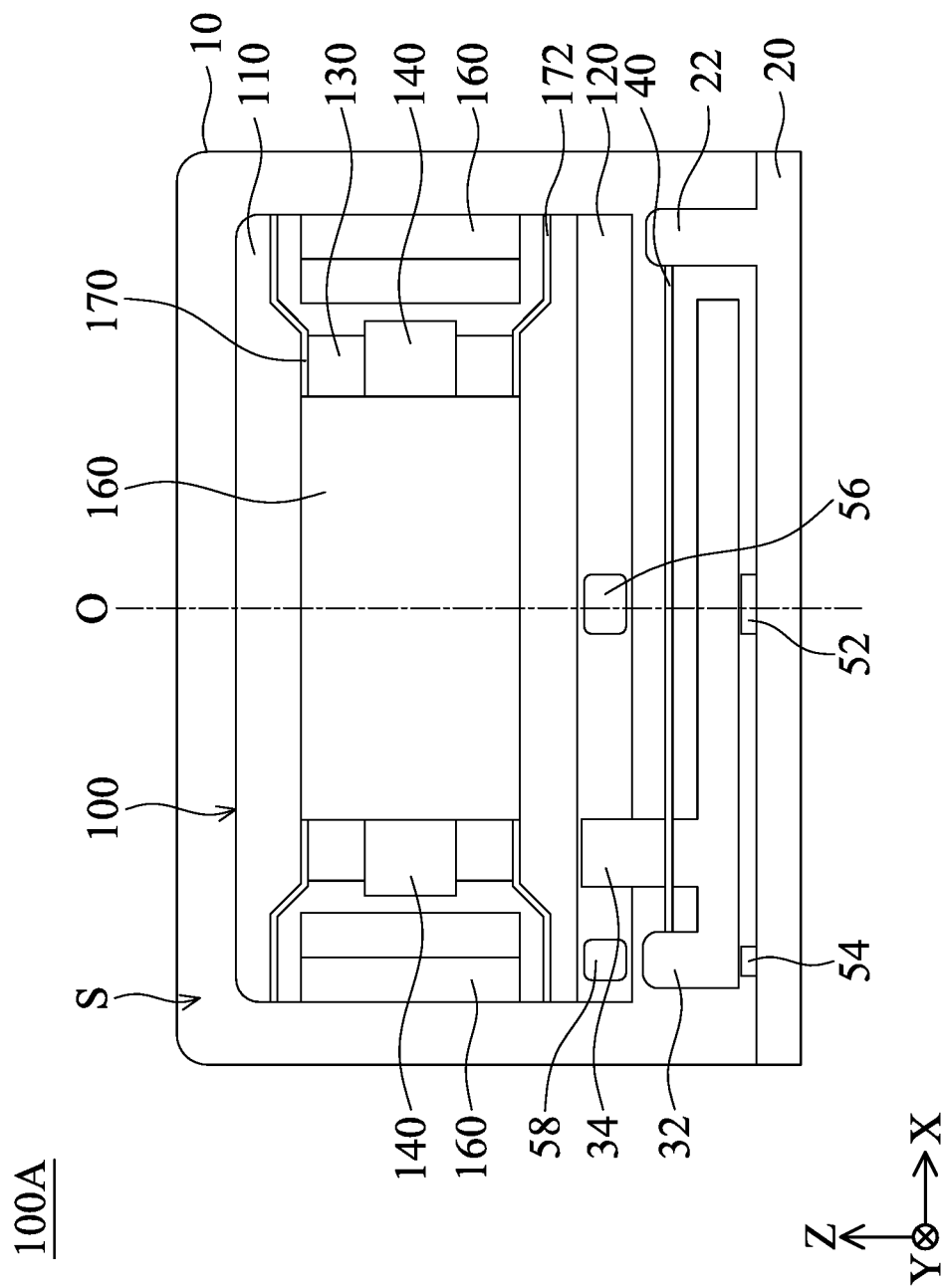
FIG. 9A is a schematic view of the optical assembly in some embodiments of the present disclosure.
Figure 9B:
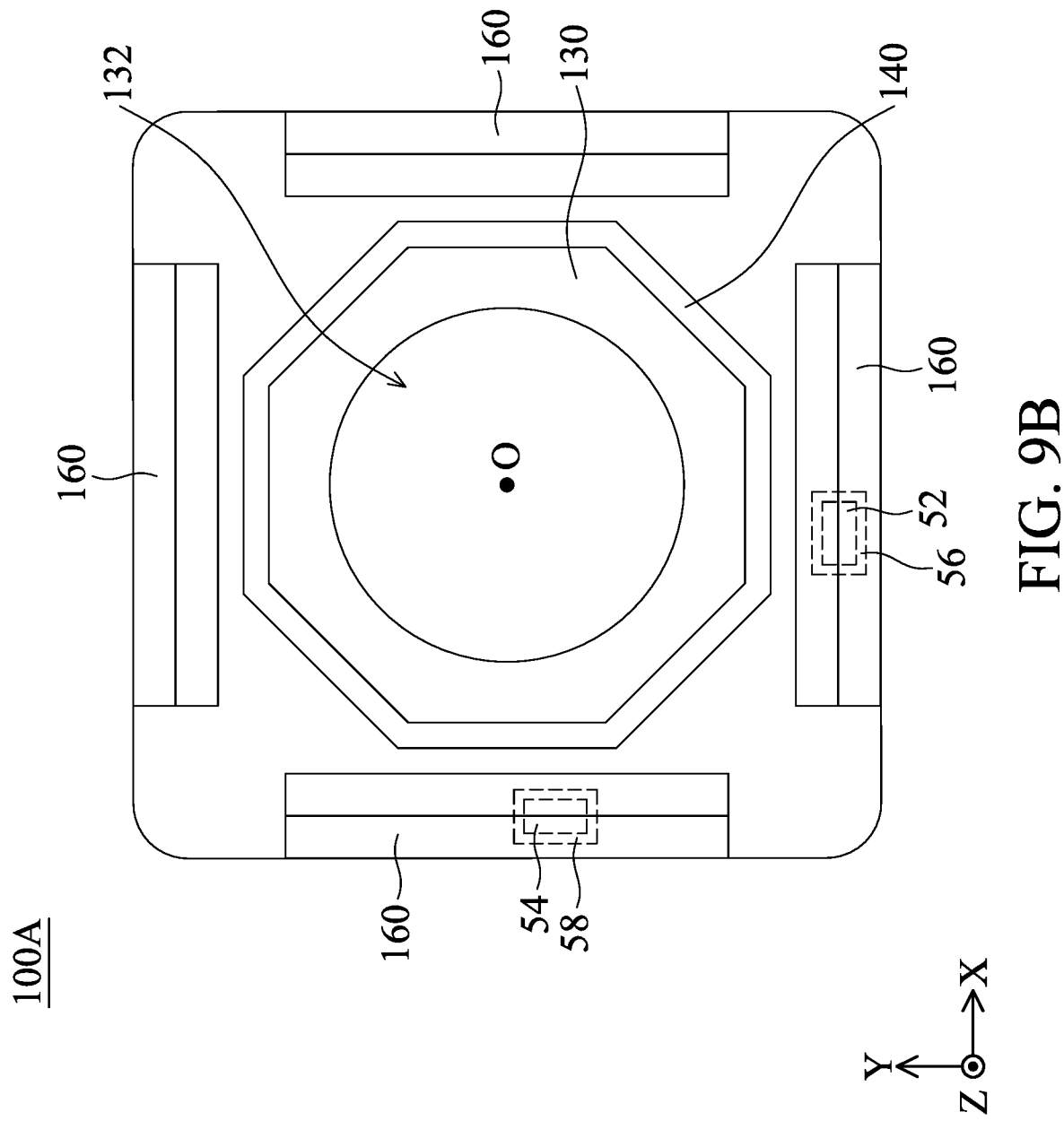
FIG. 9B is a top view of some elements of the optical assembly.

FIG. 9A is a schematic view of an optical assembly 100A according to some embodiments of the present disclosure, and FIG. 9B is a top view of some elements of the optical assembly 100A. The portions of the optical assembly 100A that are similar to the aforementioned optical assembly 100 will not be repeated here. It should be noted that the first reference element 56, the second reference element 58 and the second inner driving element 160 of the optical assembly 100A are different elements. For example, the first reference element 56 and the second reference element 58 of the optical assembly 100A may be disposed on the base 120 and separated from the inner driving element 160. In this way, the distance between the first reference element 56 and the first position sensing element 52 and the distances between the second reference element 58 and the second position sensing element 54 may be reduced to improve the performance of the sensors.

In some embodiments, as shown in FIG. 9B, when viewed along the main axis O, the inner fixed portion IF (e.g. the base 120) has a polygonal structure, and the inner driving assembly ID (e.g. the second inner driving element 160) is positioned at a first side (e.g. the lower side) of the inner fixed portion IF, and the first position sensing element 52 is also positioned at the first side. In addition, when viewed along the main axis O, the inner driving assembly ID at least partially overlaps the first position sensing element 52 to reduce the size of the driving mechanism 1 in other directions, thereby achieving miniaturization.

Figure 10A:
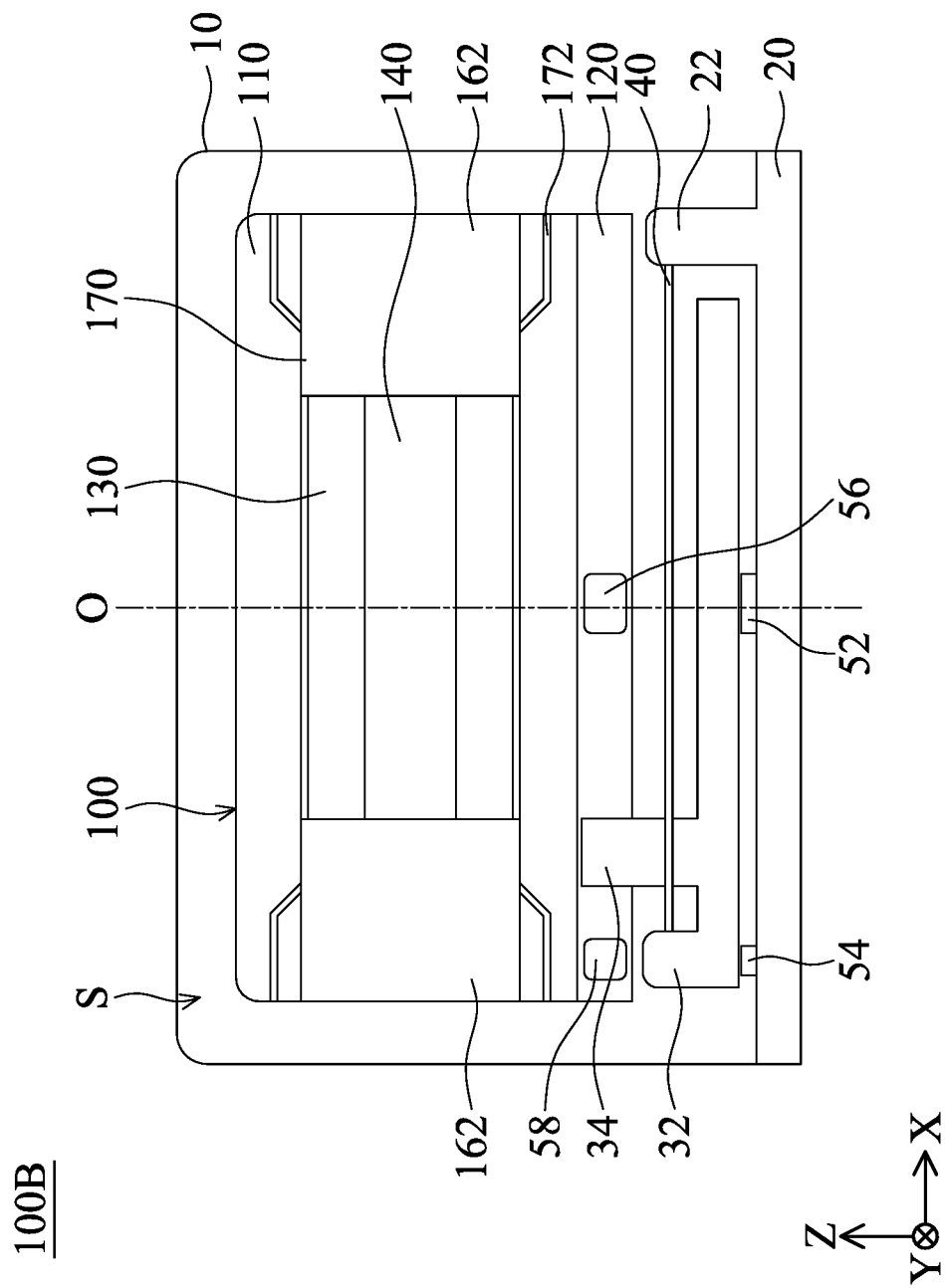
FIG. 10A is a schematic view of the optical assembly in some embodiments of the present disclosure.
Figure 10B:
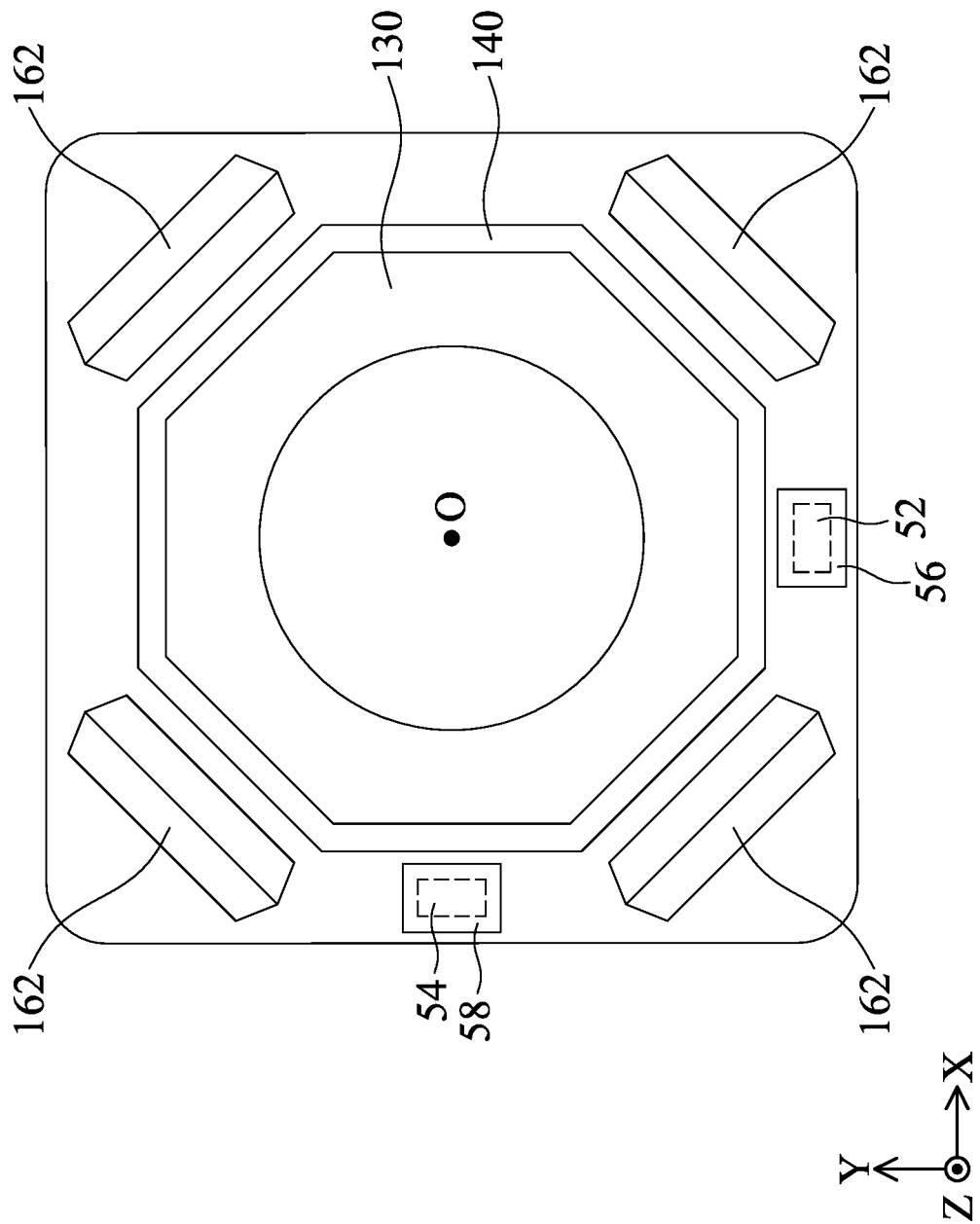
FIG. 10B is a top view of some elements of the optical assembly.

FIG. 10A is a schematic view of an optical assembly 100B according to some embodiments of the present disclosure, and FIG. 10B is a top view of some elements of the optical assembly 100B. The portions of the optical assembly 100B that are similar to the aforementioned optical assembly 100 will not be repeated here. It should be noted that when viewed along the main axis O, the inner fixed portion IF (base 120) has a polygonal structure, and the optical assembly 100B has a second inner driving element 162 disposed at the corner. The first position sensing element 52 and the first reference element 56 are positioned at the first side of the base 120 (e.g. the lower side), and the second position sensing element 54 and the second reference element 58 are positioned at the second side of the base 120 (e.g. left side). Thereby, the first position sensing element 52 and the second position sensing element 54 may respectively sense the movement of the optical assembly 100B in different directions. In addition, magnetic interference may be avoided to enhance the accuracy of sensing by positioning the second inner driving element 162 at the corner and the position sensing element 50 at the side.

Figure 11A:
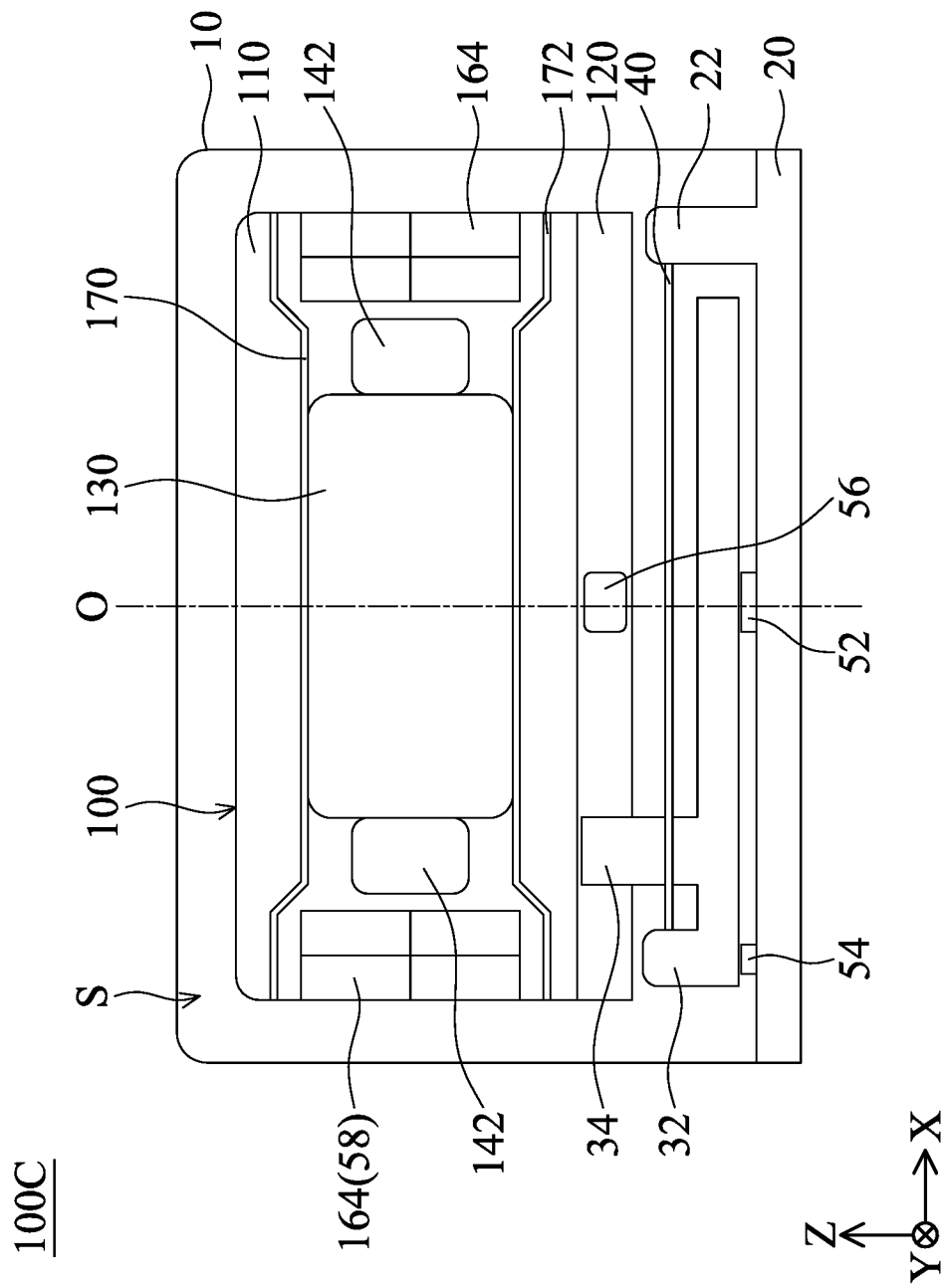
FIG. 11A is a schematic view of the optical assembly in some embodiments of the present disclosure.
Figure 11B:
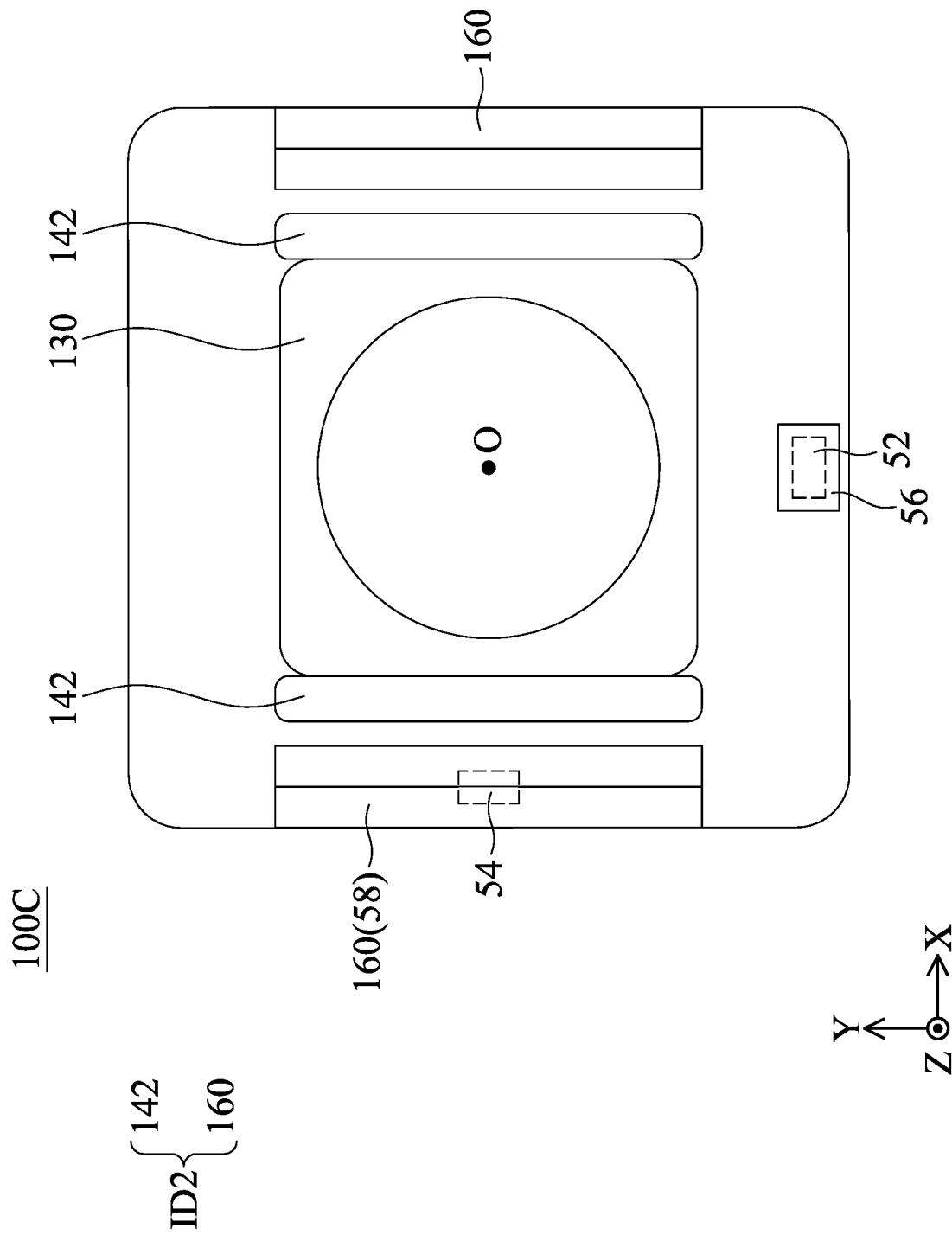
FIG. 11B is a top view of some elements of the optical assembly.

FIG. 11A is a schematic view of an optical assembly 100C according to some embodiments of the present disclosure, and FIG. 11B is a top view of some elements of the optical assembly 100C. The portions of the optical assembly 100C that are similar to the aforementioned optical assembly 100 will not be repeated here. It should be noted that when viewed along the main axis O, the inner fixed portion IF has a polygonal structure, and the inner driving assembly ID2 (including the first inner driving element 142 and the second inner driving element 160) is positioned at the first side of the inner fixed portion IF (e.g. the left side), the first position sensing element 52 is positioned at the second side (e.g. the lower side), and the second position sensing element 54 is positioned at the first side. The second reference element 58 and the second inner driving element 160 are the same element, and the first reference element 56 and the second inner driving element 160 are disposed separately.

In addition, as shown in FIG. 11A, the second inner driving element 164 may include a multipolar magnet, and may have different magnetic pole directions. In the Z direction, the magnetic pole directions of the upper and lower sides of the second inner driving element 160 may be opposite. In the X direction, the magnetic pole direction of the left and right sides of the second inner driving element 160 may be opposite. At this time, the first inner driving element 142 may have a ring shape. Therefore, the driving force of the inner driving component ID2 may be increased.

Figure 12:
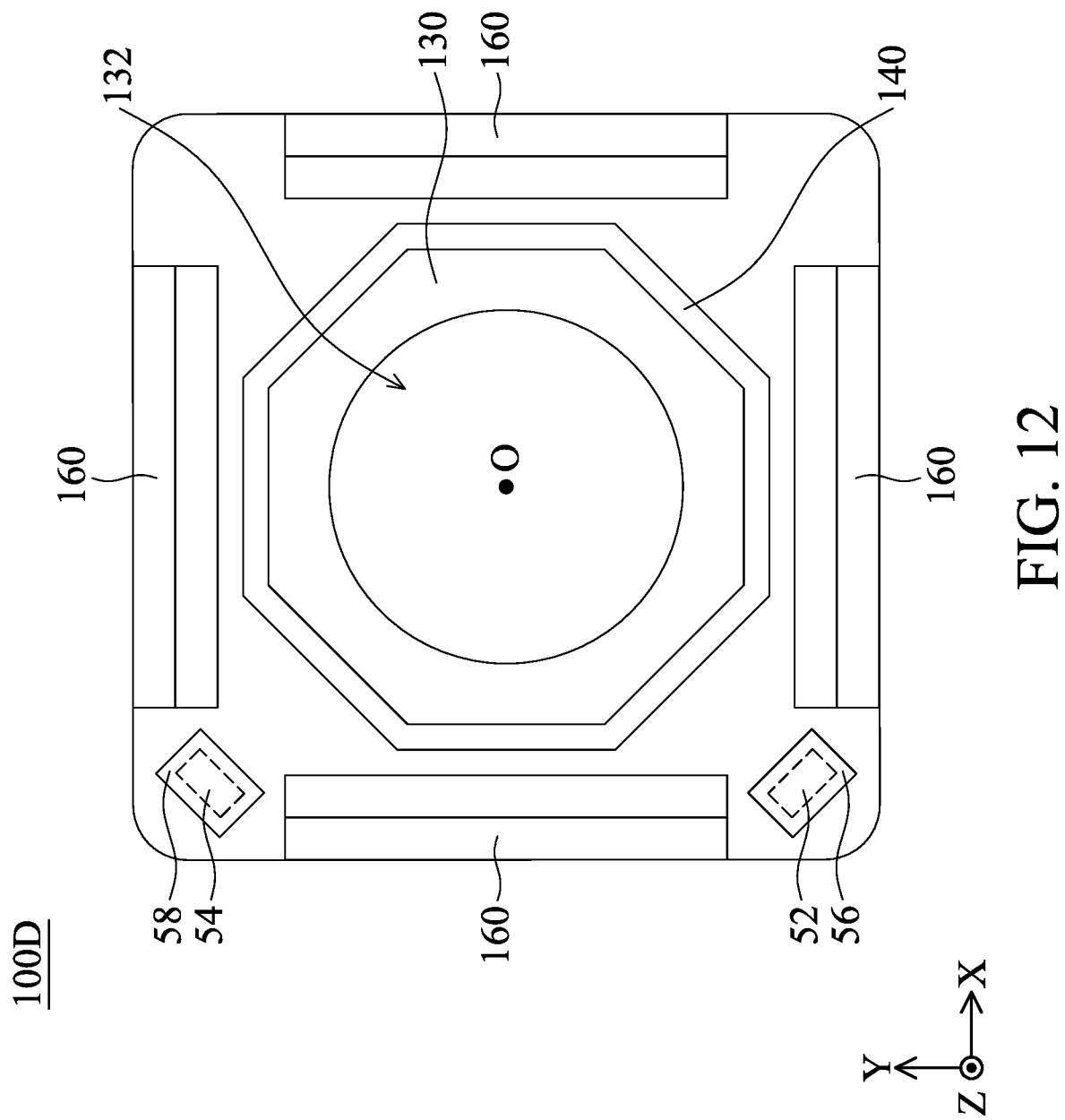
FIG. 12 is a top view of some elements of the optical assembly in some embodiments of the present disclosure.

FIG. 12 is a top view of some elements of the optical assembly 100D according to some embodiments of the present disclosure. When viewed along the main axis O, the inner fixing part IF has a polygonal structure, the inner driving element ID3 (e.g. the second inner driving element 160) is positioned at the first side of the inner fixing part IF, the first position sensing element 52 and the first reference element 56 are positioned at a first corner of the inner fixed portion IF, and the second position sensing element 54 and the second reference element 58 are positioned at a second corner of the inner fixed portion IF. Because the first position sensing element 52 and the second position sensing element 54 are positioned at different corners, the movement of the optical assembly 100D in different directions may be detected. In addition, the first position sensing element 52, the second position sensing element 54, and the second inner driving element 160 are positioned at different positions (for example, not overlap each other in the Z direction), so the chance of magnetic interference between the elements may be decreased to increase the accuracy of sensing.

Figure 13:
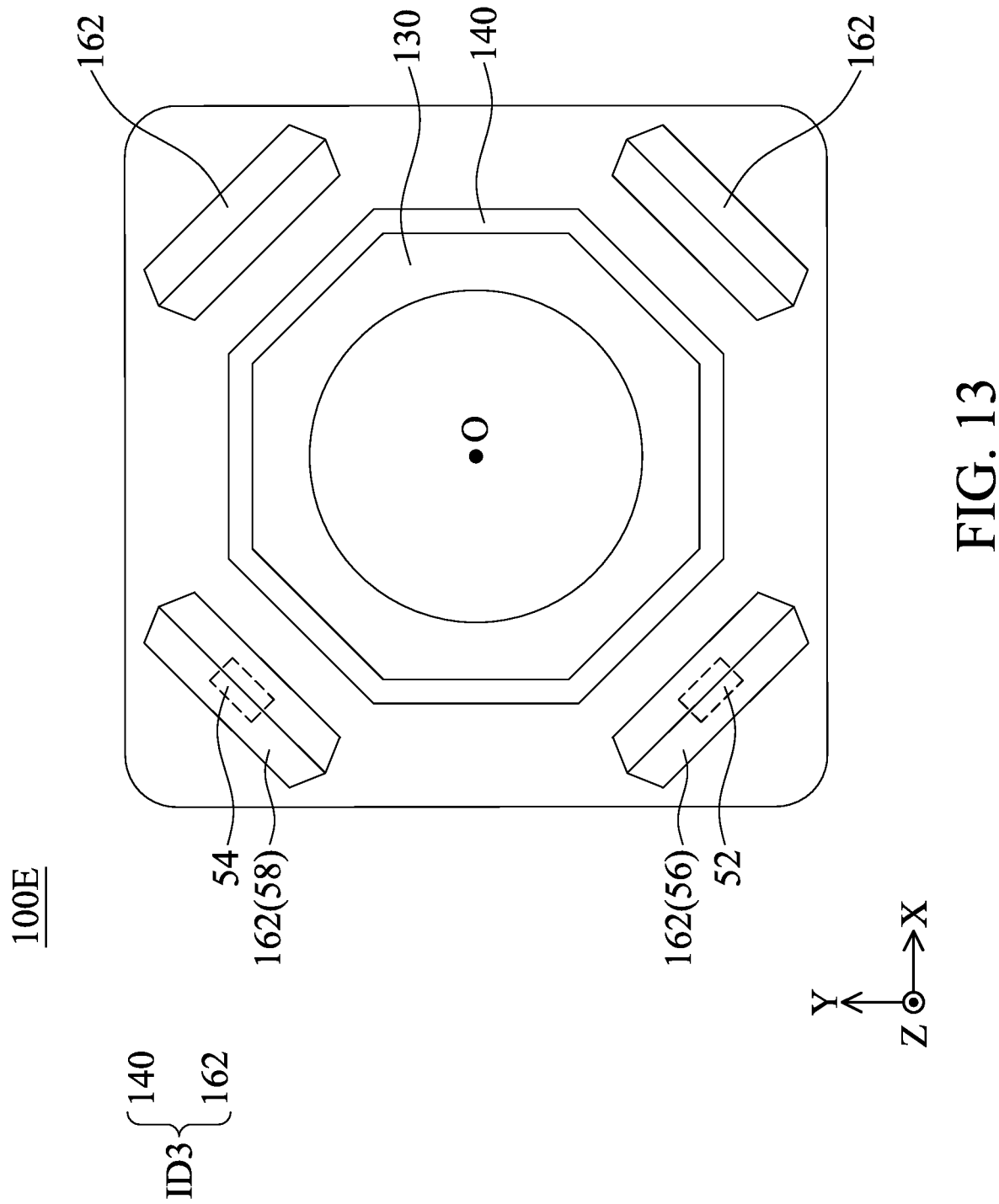
FIG. 13 is a top view of some elements of the optical assembly in some embodiments of the present disclosure.

FIG. 13 is a top view of some elements of the optical assembly 100E according to some embodiments of the present disclosure. As shown in FIG. 13, when viewed along the main axis O, the inner fixed portion IF has a polygonal structure, and the inner driving assembly (for example, the second inner driving elements 162) is positioned at the first corner and the second corner of the inner fixed portion IF. The first position sensing element 52 is positioned at a first corner, and the second position sensing element 54 is positioned at a second corner. In other words, when viewed along the main axis O, the inner driving assembly ID (including the first inner driving element 140 and the second inner driving element 162) at least partially overlaps the first position sensing element 52. In this way, no additional first reference elements 56 and second reference elements 58 is required, and the second inner driving elements 162 at the first corner and the second corner are respectively used as the first reference element 56 and the second reference element 58 to reduce the number of required elements, and miniaturization is achieved.

Figure 14:
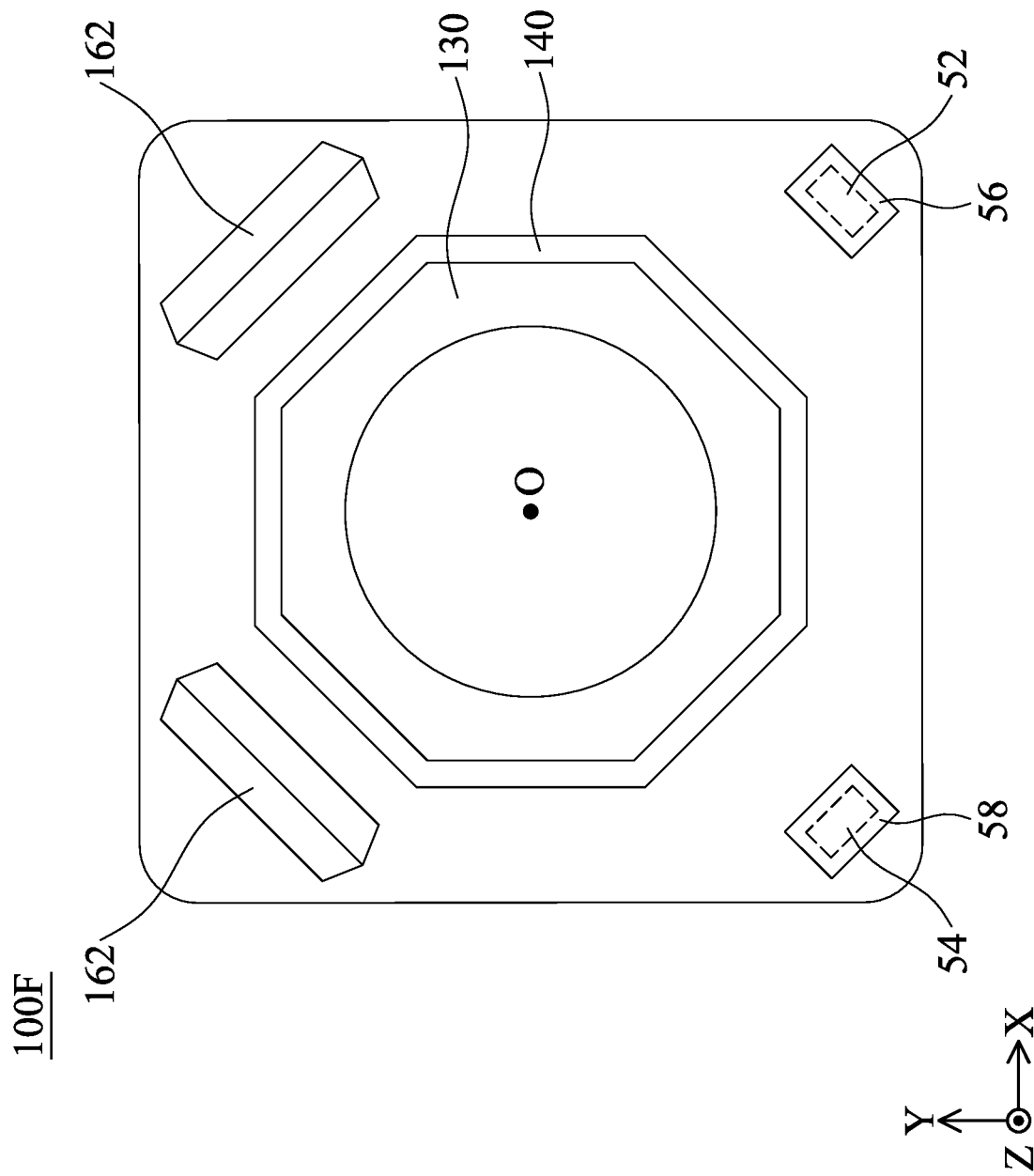
FIG. 14 is a top view of some elements of the optical assembly in some embodiments of the present disclosure.

FIG. 14 is a top view of some elements of the optical assembly 100F according to some embodiments of the present disclosure. As shown in FIG. 14, when viewed along the main axis O, the inner fixed portion IF has a polygonal structure, and the inner driving assembly ID (e.g. the second inner driving element 162) is positioned at a first corner of the inner fixed portion IF. The position sensing element 52 and the first reference element 56 are positioned at a second corner, and the second position sensing element 54 and the second reference element 58 are positioned at a third corner. The first position sensing element 52, the second position sensing element 54, and the second inner driving element 162 are positioned at different corners of the inner fixed portion IF, so the magnetic interference between the elements may be reduced.

In summary, a driving mechanism is provided. The driving mechanism includes a fixed portion, a movable portion, and a driving assembly. The movable portion is movably connected to the fixed portion. The driving assembly is used for driving the movable portion to move relative to the fixed portion. The driving assembly is driven by a control signal provided by a control assembly. The driving assembly includes shape memory alloy. Therefore, the control accuracy of the driving mechanism may be increased, and miniaturization may be achieved.

Although embodiments of the present disclosure and their advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A driving mechanism, comprising:
   a fixed portion;
   a movable portion movable relative to the fixed portion;
   a driving assembly used for driving the movable portion to move relative to the fixed portion, wherein the driving assembly drives the movable portion by a control signal provided by a control assembly, and the driving assembly comprises shape memory alloy; and
   a position sensing assembly for detecting a movement of the movable portion relative to the fixed portion, and the control assembly receives a position signal provided by the position sensing assembly;
   wherein the movable portion vibrates relative to the fixed portion at a frequency that is lower than a maximum frequency, and the maximum frequency is less than 10000 Hz;
   wherein after the control assembly receives an environmental signal provided by an environmental sensing assembly, the control signal is provided to the driving assembly by the control assembly, and the control assembly removes high-frequency signal from the environmental signal after the control assembly receives the environmental signal.

2. The driving mechanism as claimed in claim 1, wherein the movable portion is used for connecting to an optical assembly having a main axis, and the movable portion is positioned in an accommodation space of the fixed portion;
   wherein the position signal comprises a first position signal and a second position signal, and the position sensing assembly comprises:
   a first position sensor used for detecting the movement of the movable portion relative to the fixed portion in a first dimension, and used for providing the first position signal;
   a second position sensor used for detecting the movement of the movable portion relative to the fixed portion in a second dimension, and used for providing the second position signal;
   a first reference element corresponding to the first position sensor, wherein the first reference element comprises a first magnetic unit; and
   a second reference element corresponding to the second position sensor, wherein the second reference element comprises a second magnetic unit, and at least a part of the position sensing assembly is positioned in the accommodation space.

3. The driving mechanism as claimed in claim 2, wherein the driving assembly comprises:
   a first driving element used for driving the movable portion to move relative to the fixed portion, and the first driving element comprises:
   a first driving unit used for driving the movable portion to move relative to the fixed portion, wherein the material of the first driving unit comprises shape memory alloy, and the first driving unit is strip-shaped and extends in a first direction; and
   a second driving unit used for driving the movable portion to move relative to the fixed portion, wherein the material of the second driving unit comprises shape memory alloy, and the second driving unit is strip-shaped and extends in a second direction;
   a second driving element used for driving the movable portion to move relative to the fixed portion, and the second driving element comprises:

a third driving unit used for driving the movable portion to move relative to the fixed portion, wherein the material of the third driving unit comprises shape memory alloy, and the third driving unit is strip-shaped and extends in a third direction; and a fourth driving unit used for driving the movable portion to move relative to the fixed portion, wherein the material of the fourth driving unit comprises shape memory alloy, and the fourth driving unit is strip-shaped and extends in a fourth direction.

4. The driving mechanism as claimed in claim 3, wherein:
the first direction is different than the third direction, the second direction is different than the third direction, the first direction is substantially parallel to the second direction, and the third direction is substantially parallel to the fourth direction;
wherein the control signal comprises:
a first driving signal provided to the first driving unit;
a second driving signal provided to the second driving unit;
a third driving signal provided to the third driving unit; and
a fourth driving signal provided to the fourth driving unit;
wherein the environmental sensing assembly is used for detecting influence of environment on the driving mechanism, and the environmental sensing assembly comprises an inertia sensing element.

5. The driving mechanism as claimed in claim 4, wherein the first driving element is used for driving the movable portion to move relative to the fixed portion along the first dimension, the second driving element is used for driving the movable portion to move relative to the fixed portion along the second dimension;
the first driving signal, the second driving signal, the third driving signal, and the fourth driving signal do not comprise periodic signals having a frequency higher than the maximum frequency;
the control assembly removes a portion of the environmental signal that has a frequency higher than 10000 Hz after the control assembly receives the environmental signal;
wherein the control assembly controls the driving assembly according to a preparation mode, a first control mode, a second control mode, a third control mode, or a fourth control mode.

6. The driving mechanism as claimed in claim 5, wherein:
during the preparation mode, the control assembly drives the driving assembly according to the position signal to position the movable portion at a predetermined position relative to the fixed portion;
during the preparation mode, the first driving signal does not include a periodic signal with a frequency higher than 10000 Hz;
during the preparation mode, the control signal does not include a periodic signal with a frequency higher than 10000 Hz;
during the preparation mode, the first driving signal has a voltage or a current higher than 0 at any time;
during the preparation mode, the second driving signal has a voltage or a current higher than 0 at any time.

7. The driving mechanism as claimed in claim 6, wherein:
during the first control mode, the control assembly controls the driving assembly to drive the movable portion to move relative to the fixed portion in a first target direction;
during the first control mode, the control assembly controls the driving assembly according to the first position signal;
during the first control mode, the first driving signal has a voltage or a current higher than 0 at any time;
during the first control mode, the second driving signal has a voltage or a current higher than 0 at any time;
during the first control mode, the first driving signal does not include a periodic signal with a frequency higher than 10000 Hz;
during the first control mode, the control signal does not include a periodic signal with a frequency higher than 10000 Hz;
during the first control mode, the voltage or the current of the first driving signal is higher than the voltage or the current of the second driving signal;
during the first control mode, the control assembly increases the voltage or the current of the first driving signal;
during the first control mode, the control assembly decreases the voltage or the current of the second driving signal;
during the first control mode, the control assembly increases a voltage or a current of the third driving signal;
during the first control mode, the control assembly increases a voltage or a current of the fourth driving signal.

8. The driving mechanism as claimed in claim 7, wherein:
during the second control mode, the control assembly controls the driving assembly to drive the movable portion to move relative to the fixed portion in a second target direction;
during the second control mode, the control assembly controls the driving assembly according to the first position signal;
during the second control mode, the first driving signal has a voltage or a current higher than 0 at any time;
during the second control mode, the second driving signal has a voltage or a current higher than 0 at any time;
during the second control mode, the first driving signal does not include a periodic signal with a frequency higher than 10000 Hz;
during the second control mode, the control signal does not include a periodic signal with a frequency higher than 10000 Hz;
during the second control mode, the control assembly increases the voltage or the current of the first driving signal;
during the second control mode, the control assembly increases the voltage or the current of the second driving signal;
during the second control mode, the control assembly decreases the voltage or the current of the third driving signal;
during the second control mode, the control assembly decreases the voltage or the current of the fourth driving signal.

9. The driving mechanism as claimed in claim 8, wherein:
during the third control mode, the control assembly controls the driving assembly according to the environmental signal;
during the third control mode, the first driving signal has a voltage or a current higher than 0 at any time;
during the third control mode, the second driving signal has a voltage or a current higher than 0 at any time;

during the third control mode, the first driving signal does not include a periodic signal with a frequency higher than 10000 Hz;
during the third control mode, the control signal does not include a periodic signal with a frequency higher than 10000 Hz;
during the third control mode, the voltage or the current of the first driving signal is higher than the voltage or the current of the second driving signal;
during the third control mode, the control assembly increases the voltage or the current of the first driving signal;
during the third control mode, the control assembly decreases the voltage or the current of the second driving signal;
during the third control mode, the control assembly decreases the voltage or the current of the third driving signal;
during the third control mode, the control assembly decreases the voltage or the current of the fourth driving signal.

10. The driving mechanism as claimed in claim 9, wherein:
during the fourth control mode, the control assembly controls the driving assembly according to the environmental signal;
during the fourth control mode, the first driving signal has a voltage or a current higher than 0 at any time;
during the fourth control mode, the second driving signal has a voltage or a current higher than 0 at any time;
during the fourth control mode, the first driving signal does not include a periodic signal with a frequency higher than 10000 Hz;
during the fourth control mode, the control signal does not include a periodic signal with a frequency higher than 10000 Hz;
during the fourth control mode, the control assembly increases the voltage or the current of the first driving signal;
during the fourth control mode, the control assembly increases the voltage or the current of the second driving signal;
during the fourth control mode, the control assembly decreases the voltage or the current of the third driving signal;
during the fourth control mode, the control assembly decreases the voltage or the current of the fourth driving signal.

11. The driving mechanism as claimed in claim 10, wherein:
after the control assembly receives the environmental signal, a portion of the environmental signal that has a frequency higher than the maximum frequency is removed;
the inertia sensing element comprises an accelerometer or a gyroscope;
during the preparation mode, the control assembly drives the first driving element according to the first position signal to position the movable portion at the predetermined position relative to the fixed portion;
during the preparation mode, the control assembly drives the second driving element according to the second position signal to position the movable portion at the predetermined position relative to the fixed portion;
during the preparation mode, the control signal does not include a periodic signal with a frequency higher than the maximum frequency;
during the preparation mode, the first driving signal does not include a periodic signal with a frequency higher than the maximum frequency.

12. The driving mechanism as claimed in claim 11, wherein:
during the first control mode, the control signal does not include a periodic signal with a frequency higher than the maximum frequency;
during the first control mode, the first driving signal does not include a periodic signal with a frequency higher than the maximum frequency;
during the first control mode, an absolute value of the voltage or the current of the first driving signal increased by the control assembly is different than an absolute value of the voltage or the current of the third driving signal increased by the control assembly;
during the second control mode, the control signal does not include a periodic signal with a frequency higher than the maximum frequency;
during the second control mode, the first driving signal does not include a periodic signal with a frequency higher than the maximum frequency.

13. The driving mechanism as claimed in claim 12, wherein:
during the third control mode, the control assembly further controls the driving assembly according to the position signal;
during the third control mode, the control signal does not include a periodic signal with a frequency higher than the maximum frequency;
during the third control mode, the first driving signal does not include a periodic signal with a frequency higher than the maximum frequency;
during the fourth control mode, the control assembly further controls the driving assembly according to the position signal;
during the fourth control mode, the control signal does not include a periodic signal with a frequency higher than the maximum frequency;
during the fourth control mode, the first driving signal does not include a periodic signal with a frequency higher than the maximum frequency.

14. The driving mechanism as claimed in claim 13, wherein:
during the preparation mode, the control signal only comprises DC voltage or DC current;
during the preparation mode, the first driving signal only comprises DC voltage or DC current;
during the first control mode, the control signal only comprises DC voltage or DC current;
during the first control mode, the first driving signal only comprises DC voltage or DC current;
during the first control mode, the absolute value of the voltage or the current of the first driving signal increased by the control assembly is higher than the absolute value of the voltage or the current of the third driving signal increased by the control assembly;
during the first control mode, the absolute value of the voltage or the current of the first driving signal increased by the control assembly is higher than an absolute value of the voltage or the current of the fourth driving signal increased by the control assembly.

15. The driving mechanism as claimed in claim 14, wherein:
during the second control mode, the control signal only comprises DC voltage or DC current;

during the second control mode, the first driving signal only comprises DC voltage or DC current;

during the third control mode, the first driving signal only comprises DC voltage or DC current;

during the third control mode, the control signal only comprises a periodic signal with a frequency that is identical to the frequency of the environmental signal;

during the fourth control mode, the first driving signal only comprises DC voltage or DC current;

during the fourth control mode, the control signal only comprises a periodic signal with a frequency that is identical to the frequency of the environmental signal.

16. The driving mechanism as claimed in claim 15, wherein:

during the third control mode, the control signal only comprises DC voltage or DC current;

during the fourth control mode, the control signal only comprises DC voltage or DC current.

17. The driving mechanism as claimed in claim 16, wherein the optical assembly further comprises:

an inner fixed portion having a polygonal structure when viewed along the main axis;

an inner movable portion used for connecting the optical element; and an inner driving assembly used for driving the inner movable portion to move relative to the inner fixed portion.

18. The driving mechanism as claimed in claim 17, wherein:

the inner driving assembly is positioned at a first corner of the inner fixed portion;

the first position sensor is positioned at a first side of the inner fixed portion or the first corner of the inner fixed portion, when the first position sensor is positioned at the first corner, the inner driving assembly at least partially overlaps the first position sensor when viewed along the main axis;

the control assembly is positioned outside the accommodation space, and the position sensing assembly is at least partially positioned outside the accommodation space.

19. The driving mechanism as claimed in claim 17, wherein:

the inner driving assembly is positioned at a first side of the inner fixed portion;

the first position sensor is positioned at a first corner of the inner fixed portion or the first side of the inner fixed portion, when the first position sensor is positioned at the first side, the inner driving assembly at least partially overlaps the first position sensor when viewed along the main axis;

the control assembly and the first position sensor are formed as one piece.

20. The driving mechanism as claimed in claim 17, wherein:

the inner driving assembly is positioned at a first side of the inner fixed portion or a first corner of the inner fixed portion;

the first position sensor is positioned at a second side of the inner fixed portion or a second corner of the inner fixed portion, and the inner driving assembly does not overlap the first position sensor when viewed along the main axis;

wherein the entire position sensing assembly is positioned in the accommodation space.

* * * * *